US012672123B2

(12) United States Patent
Fellhauer et al.

(10) Patent No.: US 12,672,123 B2
(45) Date of Patent: Jun. 30, 2026

(54) COMMUNICATION DEVICES AND METHODS

(71) Applicant: Sony Group Corporation, Tokyo (JP)

(72) Inventors: Felix Fellhauer, Stuttgart (DE); Dana Ciochina, Stuttgart (DE); Thomas Handte, Stuttgart (DE)

(73) Assignee: SONY GROUP CORPORATION, Tokyo (JP)

( * ) Notice: Subject to any disclaimer, the term of this patent is extended or adjusted under 35 U.S.C. 154(b) by 362 days.

(21) Appl. No.: 17/607,425

(22) PCT Filed: May 6, 2020

(86) PCT No.: PCT/EP2020/062518
§ 371 (c)(1),
(2) Date: Oct. 29, 2021

(87) PCT Pub. No.: WO2020/225280
PCT Pub. Date: Nov. 12, 2020

(65) Prior Publication Data
US 2022/0225344 A1 Jul. 14, 2022

(30) Foreign Application Priority Data

May 6, 2019 (EP) ..................................... 19172827

(51) Int. Cl.
*H04W 72/121* (2023.01)
*H04L 1/00* (2006.01)
(Continued)

(52) U.S. Cl.
CPC ......... *H04W 72/121* (2013.01); *H04L 1/0003* (2013.01); *H04W 48/10* (2013.01);
(Continued)

(58) Field of Classification Search
None
See application file for complete search history.

(56) References Cited

U.S. PATENT DOCUMENTS

| | | | | |
|---|---|---|---|---|
| 10,237,891 | B1 * | 3/2019 | Chu ...................... | H04W 48/16 |
| 2008/0165797 | A1 * | 7/2008 | Aceves ................... | H04W 8/04 370/468 |

(Continued)

FOREIGN PATENT DOCUMENTS

| | | |
|---|---|---|
| CN | 109075812 A | 12/2018 |
| EP | 3383109 A1 | 10/2018 |
| WO | 2017/180845 A1 | 10/2017 |

OTHER PUBLICATIONS

International Search Report and Written Opinion mailed on Jul. 9, 2020, received for PCT Application PCT/EP2020/062518, Filed on May 6, 2020, 10 pages.

(Continued)

*Primary Examiner* — Jutai Kao
(74) *Attorney, Agent, or Firm* — XSENSUS, LLP

(57) ABSTRACT

A first communication device comprises circuitry configured to simultaneously communicate with a group of two or more second communication devices. The circuitry is configured to generate schedule information that schedules, for two or more subsequent time slots, the assignment of different resource units to the second communication devices of the group of second communication devices to indicate, per time slot or per group of time slots, which second communication device of the group shall use which resource unit for data transmission, transmit the schedule information to the group of second communication devices, and receive data in subsequent time slots from second communication devices of the group that use the resource units according to the assignment scheduled by the schedule information for data transmission.

20 Claims, 16 Drawing Sheets

(51) Int. Cl.

| | | |
|---|---|---|
| *H04W 48/10* | (2009.01) | |
| *H04W 72/0446* | (2023.01) | |
| *H04W 72/1263* | (2023.01) | |
| *H04W 74/04* | (2009.01) | |

(52) U.S. Cl.
CPC ... *H04W 72/0446* (2013.01); *H04W 72/1263* (2013.01); *H04W 74/04* (2013.01)

(56) References Cited

U.S. PATENT DOCUMENTS

| 2015/0124775 A1* | 5/2015 | Guo ..................... H04W 8/005 |
| | | 370/329 |
| 2018/0227944 A1 | 8/2018 | Yerramalli et al. |
| 2019/0289633 A1* | 9/2019 | Fang .................. H04L 27/2601 |
| 2019/0313466 A1* | 10/2019 | Ko ........................... H04L 1/00 |
| 2020/0146031 A1* | 5/2020 | Alasti .................. H04L 5/0078 |
| 2020/0336241 A1* | 10/2020 | Kilian .................. H04L 12/282 |
| 2021/0144766 A1* | 5/2021 | Kim ......................... H04L 5/14 |
| 2022/0158768 A1* | 5/2022 | Minotani ............. H04L 1/1896 |

OTHER PUBLICATIONS

"Draft Standard for Information technology—Telecommunications and information exchange between systems Local and metropolitan area networks_Specific requirements", IEEE P802.11ax™/D4.1, Apr. 2019, pp. 1-754.
"IEEE Standard for Information technology—Telecommunications and information exchange between systems Local and metropolitan area networks—Specific requirements", IEEE Standards Association, IEEE Std 802.11™, 2016, 3534 pages.

* cited by examiner

COMMUNICATION DEVICES AND METHODS

CROSS-REFERENCE TO RELATED APPLICATIONS

The present application is based on PCT filing PCT/EP2020/062518, filed May 6, 2020, which claims priority to EP 19172827.8, filed May 6, 2019, the entire contents of each are incorporated herein by reference.

BACKGROUND

Field of the Disclosure

The present disclosure relates first and second communication devices and method. The present disclosure relates particularly to a first communication devices comprising circuitry configured to simultaneously communicate with a group of two or more second communication devices and to a corresponding second communication device.

Description of Related Art

In IEEE802.11ax standard amendment (in the following also briefly referred to as 802.11ax), multi-user support by frequency multiplex (e.g. OFDMA) and/or spatial multiplex (MU-MIMO) has been introduced. Each feature is supported in downlink, i.e., the AP (Access Point; herein referred to as first communication device) transmits to one or more STAs (Stations; herein referred to as second communication devices), and in uplink, i.e., one or more STAs transmit to the AP.

In downlink, the AP announces, at the beginning of the multi-user (MU) physical protocol data unit (PPDU) as part of the preamble/header, which STA it is going to serve data. In addition, the AP allocates one or more resource units (RUs) to each STA to be served. In the payload part of a MU-PPDU, the AP transmits data intended for a particular STA on the previously (i.e. in the preamble/header of this MU-PPDU) allocated RU.

RUs are defined such that each RU may be independently modulated and demodulated by a STA. In order to achieve independent RUs, an appropriate precoding may be necessary as it is the case for MU-MIMO, where an appropriate (spatial) precoder conditions the channel such that independent data streams are feasible. The definition of such a precoder may require channel sounding before transmission.

In uplink, the AP performs the STA-to-RU allocation first, i.e., it announces which STA should transmit on which (one or more) RUs. This information is transmitted in some sort of a trigger as part of a PPDU. Subsequently, i.e. SIFS (short inter frame spacing) after the PPDU including the trigger, all addressed STAs transmit their data on the previously allocated RUs at the same time. As a STA transmits this PPDU because it received a trigger before, this PPDU is often referred to as trigger-based (TB) PPDU. All individual TB-PPDUs superimpose on the channel and form an uplink MU-PPDU which is received by the AP.

The use of the known trigger solutions does not enable ultra-reliable low latency communications (URLLC). Further, the known trigger variants require a significant signaling overhead which is not desired at all.

The "background" description provided herein is for the purpose of generally presenting the context of the disclosure. Work of the presently named inventor(s), to the extent it is described in this background section, as well as aspects of the description which may not otherwise qualify as prior art at the time of filing, are neither expressly or impliedly admitted as prior art against the present disclosure.

SUMMARY

It is an object to provide communication devices and methods enabling ultra-reliable low latency communications, in particular simultaneous communication between a first communication device and multiple second communication devices, with limited or even minimum signaling overhead. It is a further object to provide a corresponding computer program and a non-transitory computer-readable recording medium for implementing the communication methods.

According to an aspect there is provided a first communication device comprising circuitry configured to simultaneously communicate with a group of two or more second communication devices, the circuitry being configured to generate schedule information that schedules, for two or more subsequent time slots, the assignment of different resource units to the second communication devices of the group of second communication devices to indicate, per time slot or per group of time slots, which second communication device of the group shall use which resource unit for data transmission, transmit the schedule information to the group of second communication devices, and receive data in subsequent time slots from second communication devices of the group that use the resource units according to the assignment scheduled by the schedule information for data transmission.

According to a further aspect there is provided a second communication device comprising circuitry configured to communicate with a first communication device that is configured to simultaneously communicate with a group of two or more second communication devices, the circuitry being configured to receive schedule information that schedules, for two or more subsequent time slots, the assignment of different resource units to the second communication devices of the group of second communication devices to indicate, per time slot or per group of time slots, which second communication device of the group shall use which resource unit for data transmission, and transmit data in subsequent time slots using the resource units according to the assignment scheduled by the schedule information for the second communication device.

According to still further aspects corresponding first and second communication methods, a computer program comprising program means for causing a computer to carry out the steps of the methods disclosed herein, when said computer program is carried out on a computer, as well as a non-transitory computer-readable recording medium that stores therein a computer program product, which, when executed by a processor, causes the methods disclosed herein to be performed are provided.

Embodiments are defined in the dependent claims. It shall be understood that the disclosed communication methods, the disclosed computer program and the disclosed computer-readable recording medium have similar and/or identical further embodiments as the claimed communication devices and as defined in the dependent claims and/or disclosed herein.

One of the aspects of the disclosure is to make use of schedule information, which reserves multiple time slots for use by one or more second communication devices for transmitting data to a first communication device, e.g. as uplink transmission. In this context, an uplink time slot may cover two or more TB PPDUs (trigger-based physical protocol data units). The length of such a time slot is defined in the trigger and/or continuation trigger. STAs transmitting TB PPDUs shall not deviate from that length but some inaccuracy may be allowed.

Each data transmission uses mutually independent resource units (RUs). RUs are defined over time, frequency, and/or space. The schedule information thus contains the assignment of RUs to second communication devices for each of the data transmissions covered by the schedule information. The proposed schedule information, which may be included in a trigger frame, is in particular suitable for ultra-reliable low latency communications achieved by frequency-hopping and/or spatial-hopping and/or temporal-hopping diversity and/or low-latency automatic repeat request (ARQ) feedback. Since the schedule information is transmitted only once, e.g. at the beginning of such a transaction, signaling overhead is reduced as described above. In preferred embodiments a (short) continuation trigger may additionally be used to achieve a fast switch between downlink and uplink and avoid unwanted latency.

The second communication units are particularly configured to use the resource units according to the scheduled assignment for transmitting data in the form of data units, such as PPDUs or TB PPDUs (physical layer protocol data units, also called PHY protocol data units). For instance, a single PPDU or TB PPDU may be transmitted by a second communication unit per time slot as it may comprise multiple user data units and control/management frames. This means that a PPDU may contain one or more MPDUs (MAC layer protocol data units), i.e. an aggregation of MPDUs and zero or more control/management frames (i.e. frames or information for the communication system to operate or facilitate operation, e.g. an acknowledgement). An MPDU holds encrypted and safeguarded, potentially aggregated user data (MSDU MAC layer service data unit), including an addresses and other information.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWING

A more complete appreciation of the disclosure and many of the attendant advantages thereof will be readily obtained as the same becomes better understood by reference to the following detailed description when considered in connection with the accompanying drawings, wherein.

DETAILED DESCRIPTION OF THE EMBODIMENTS

Figure 1:
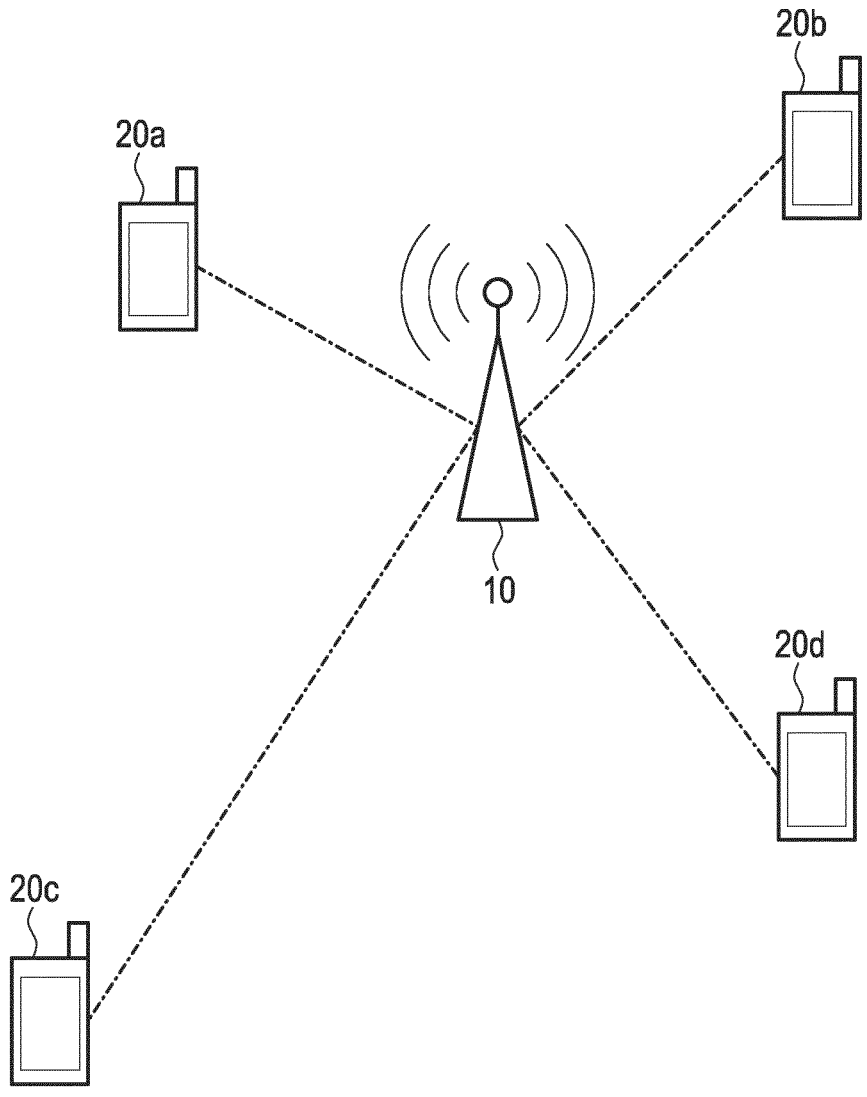
FIG. 1 shows a schematic diagram of a communication system according to the present disclosure.

Referring now to the drawings, wherein like reference numerals designate identical or corresponding parts throughout the several views, FIG. 1 shows a schematic diagram of communication system according to an embodiment of the present disclosure. The communication system is configured with a first communication device 10 and a plurality of second communication devices 20. Each of the first and second communication devices 10 and 20 has a wireless communication function. Particularly, the first communication device 10 has a multi-user communication function of transmitting frames to one or more second communication devices 20. Further, the first communication device 10 operates as an access point (AP) and the second communication devices 20 operate as a station (STA). For this reason, in the communication system, multi-user communication from the AP 10 to a plurality of STAs 20 can be performed, i.e. the first communication device 10 is able to simultaneously communicate with a group of two or more second communication devices 20 using MU-MIMO communication. Communication from the AP 10 to the STA 20 is referred to as downlink (DL) and communication from the STA 20 to the AP 10 is referred to as uplink (UL).

To enable MIMO communication, the AP 10 may be equipped with multiple antennas and multiple RF chains, allowing it to transmit multiple streams simultaneously to multiple STAs 20. Each STA 20 device may have multiple antennas and multiple RF chains to simultaneously receive multiple stream from the AP 10 or simultaneously transmit multiple streams to the AP 10.

For example, as illustrated in FIG. 1, the communication system may be configured with the AP 10 and a plurality of STAs 20a to 20d. The AP 10 and the STAs 20a to 20d are connected to each other via wireless communication and perform transmission and reception of frames directly with each other (i.e. from the AP 10 to one or more STAs 20a to 20d and from one or more STAs 20a to 20d to the AP 10). For example, the AP 10 is a communication device conforming to IEEE 802.11 and transmits a MU DL PPDU (multiuser downlink PHY protocol data unit) having each of the STAs 20a to 20d as a destination. Similarly, STAs 20a to 20d or a subset may transmit UL PPDUs at same time on different RUs in order to communicate simultaneously with AP 10.

Figure 2:
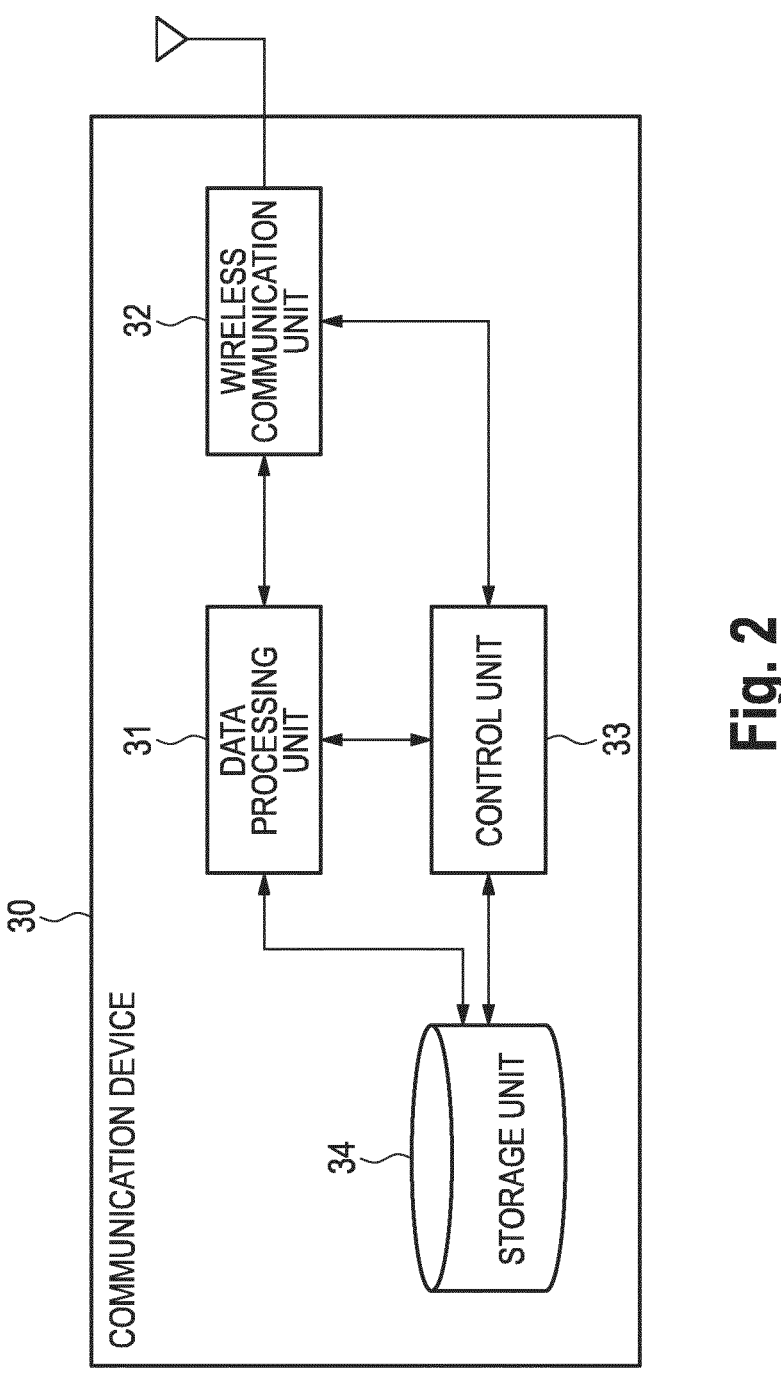
FIG. 2 shows a schematic diagram of the configuration of a first and second communication device according to an embodiment of the present disclosure.

FIG. 2 shows a schematic diagram of the configuration of a communication device 30 according to an embodiment of the present disclosure. Generally, each of the AP 10 and the STAs 20a to 20d may be configured as shown in FIG. 2 and may include a data processing unit 31, a wireless communication unit 32, a control unit 33, and a storage unit 34.

As a part of a communication device 30, the data processing unit 31 performs a process on data for transmission and reception. Specifically, the data processing unit 31 generates a frame on the basis of data from a higher layer of the communication device 30, and provides the generated frame to the wireless communication unit 32. For example, the data processing unit 31 generates a frame (or a packet, in particular a MAC packet) from the data, and performs a process on the generated frame such as addition of a MAC header for media access control (MAC), addition of an error detection code, or the like. In addition, the data processing unit 31 extracts data from the received frame, and provides the extracted data to the higher layer of the communication device 30. For example, the data processing unit 31 acquires data by analyzing a MAC header, detecting and correcting a code error, and performing a reorder process, or the like with regard to the received frame.

In this context, in WLAN terminology a frame is referred to as Service Data Units from higher layer data, to which further processing such as fragmentation, aggregation, header addition, etc. is applied in order to create MAC layer frames. Further, in WLAN terminology a packet is referred to as PHY protocol data unit (PPDU). Packets may further be understood as Physical Layer packets.

The wireless communication unit 32 has a signal processing function, a wireless interface function, and the like as part of a communication unit.

The signal processing function is a function of performing signal processing such as modulation on frames. Specifically, the wireless communication unit 32 performs encoding, interleaving, and modulation on the frame provided from the data processing unit 31 in accordance with a coding and modulation scheme set by the control unit 33, adds a preamble and a PHY header, and generates a symbol stream. Further, the wireless communication unit 32 acquires a frame by performing demodulation, decoding, and the like on the symbol stream obtained by a process of the wireless interface function, and provides the obtained frame to the data processing unit 31 or the control unit 33.

The wireless interface function is a function to transmit/ receive a signal via one or more antennas. Specifically, the wireless communication unit 32 converts a signal related to the symbol stream obtained through the process performed by the signal processing function into an analog signal, amplifies the signal, filters the signal, and up-converts the frequency. Next, the wireless communication unit 32 transmits the processed signal via the antenna. In addition, on the signal obtained via the antenna, the wireless communication unit 32 performs a process that is opposite to the process at the time of signal transmission such as down-conversion in frequency or digital signal conversion.

As a part of the communication unit, the control unit 33 (often referred to as station management entity (SME)) controls entire operation of the communication device 30. Specifically, the control unit 33 performs a process such as exchange of information between functions, setting of communication parameters, or scheduling of frames (or packets) in the data processing unit 31.

The storage unit 34 stores information to be used for process to be performed by the data processing unit 31 or the control unit 33. Specifically, the storage unit 34 stores information stored in a transmission frame, information acquired from a receiving frame, information on a communication parameter, or the like.

In an alternative embodiment, the first and second communication devices, in particular each of the AP 10 and the STAs 20, may be configured by use of circuitry that implements the units shown in FIG. 2 and the functions to be carried out. The circuitry may e.g. be realized by a programmed processor. Generally, the functionalities of first and second communication devices and the units of the communication device 30 shown in FIG. 2 may be implemented in software, hardware or a mix of software and hardware.

In WLAN, the trigger to solicit for one or more trigger-based (TB) PPDUs can be either a trigger frame or a frame holding a TRS (triggered response scheduling) control subfield. A trigger frame is a regular or (more specifically) a control frame which may be aggregated with other frames. The trigger frame holds various information about how the TB PPDU shall be transmitted, for example: length, modulation-coding scheme (MCS), RU allocation, addressed STAs, bandwidth, power control parameters, and many more. In contrast, the TRS control subfield may be part of every MAC frame as it may reside in the header of an MPDU. The TRS control subfield is rather small, for which reason the conveyed information is limited to the necessary parts and some information is implicitly extracted from the PPDU transmitting the MAC frame holding the TRS control subfield. Examples for these implicit parameters are the address of the addressed STA and bandwidth.

Figure 3:
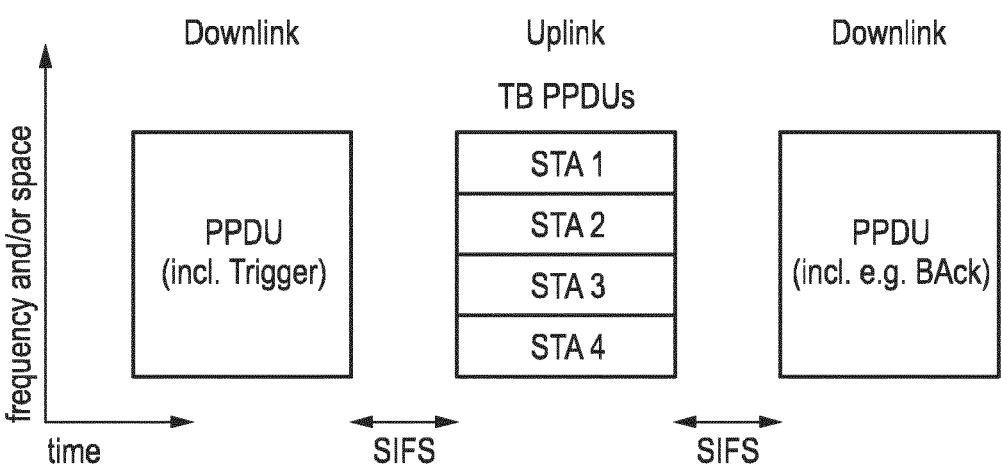
FIG. 3 shows a diagram illustrating conventional single-user downlink PPDU triggering multiple uplink TB PPDUs.
Figure 4:
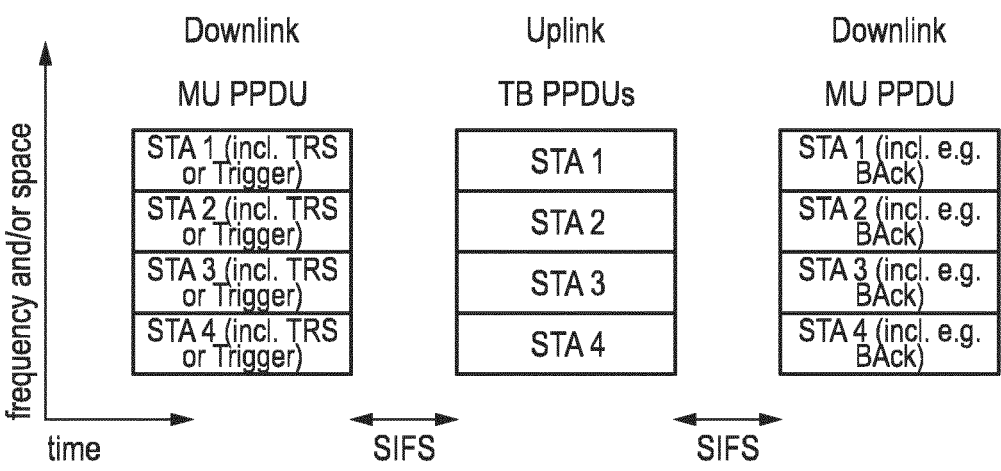
FIG. 4 shows a diagram illustrating conventional multi-user downlink PPDU triggering multiple uplink TB PPDUs.

FIGS. 3 and 4 show diagrams (frequency and/or space over time) illustrating two examples for a conventional PPDU exchange. The example of FIG. 3 assumes that the AP would like to multiplex uplink data of multiple STAs, whereas the AP transmits data to STAs in a multicast mode. Thus, the AP transmits a trigger frame to several STAs. The trigger frame carries STA address (AID-association identifier) and allocated RUs for upcoming TB PPDU. SIFS after the end of the Downlink PPDU, the addressed STAs transmit the TB PPDU at same time. SIFS after this transmission, the AP may transmit another PPDU including a (multi-STA) BlockAck for example. The example of FIG. 4 assumes that the AP would like to multiplex both downlink and uplink data of multiple STAs. In this case, the AP transmits a MU PPDU including a trigger. As each STA considers its allocated RU only, the AP needs to duplicate the TRS subfield or trigger frame for each STA. Often, the content of TRS subfield is STA specific whereas the trigger frame content is often non-STA specific.

FIGS. 3 and 4 show when it is favorable to use trigger frame or TRS subfield. In case the triggering PPDU is a SU PPDU (sent in a multicast or broadcast mode) and more than one STA is to be triggered, the trigger frame is the only trigger which can be used. In case the triggering PPDU is a MU PPDU and same STAs are to be triggered, the trigger frame and the TRS subfield may be used, however, the TRS subfield should be preferred as it requires less overhead due to its size.

It should be noted that any combination of trigger variants and response types, i.e. SU or MU response, may be used as long as it meets previous restrictions and only one trigger variant is used within a PPDU. The shortcomings of the trigger variant is related to ultra-reliable low latency communications, where it is desired to have a fast alternation between downlink and uplink and/or interchange RUs between a user group as will be explained below. With today's trigger variants, the AP would in principle be able to implement a communication link with such properties, however it would create a significant signaling overhead which is not desired at all. In addition, the proposal can provide gains when multiple STAs need to continuously stream data to an AP (e.g. video conferencing or multiple sensors streaming measurement data).

Some higher layer implementations providing an ultra-reliable low latency communication and deterministic real time communications for industrial IOT (Internet of Things), often use frequency diversity which is implemented by a hopping over different frequencies. This concept is often called frequency hopping. As an example, it may be referred to IETF's 6TiSCH (IPv6 over Time Slotted Channel Hopping), PAW (predictable and available wireless), and 802.15.4 as the physical and medium access layer those implementations use. In this regard, it is very appealing to reuse 802.11ax as the physical and medium access layer for frequency hopping implementations. Although 11 ax supports multi-user, the implementation of frequency hopping is not efficient. For this reason, the following disclosure is proposed. Similarly, time diversity and/or spatial diversity both in combination with frequency diversity or alone may be applicable for ultra-reliable low latency communication as well which may be also implemented according to the following disclosure.

Known trigger solutions do not enable ultra-reliable low latency communications (URLLC) and generally require an undesired signaling overhead. URLLC may be implemented such that each STA transmits a data unit on varying RUs (to implement frequency and/or spatial diversity/redundancy) and/or in various time slots (to implement time diversity/redundancy). Such an implementation with a known trigger frame that elicits a single uplink time slot for TB-PPDU transmissions requires the AP to send before each time slot a trigger frame indicating the allocation configuration. The signaling overhead for such an implementation is unacceptably high for several reasons:

(i) The trigger frame contains various information that does not change over different time slots, i.e. multiple trigger frames hold redundant information.

(ii) The transmission time for a trigger frame is rather long, because it is transmitted at very low rate, i.e. with robust coding and modulation in order to increase the likelihood of reception by any STA. Moreover each trigger frame transmission comes with transmission of a PHY and MAC preamble which causes additional signaling overhead.

(iii) The RU allocation information is signaled inefficiently as each trigger frame holds an explicit RU allocation information. In the regard of a URLLC data exchange as described above, an implicit RU allocation, e.g. by a function (as described below) is very beneficial.

(iv) If such an URLLC frame exchange is augmented by closed-loop ARQ, i.e. transmission of acknowledgement messages, a fast switch between downlink and uplink is crucial to achieve low latency. In this regard, the repeated transmission of long trigger frames, i.e. trigger frames with high information content, causes unwanted latency.

One of the ideas of the present disclosure is that a trigger frame solicits not only a single time slot, which is used to transmit TB PPDUs from a total of M STAs, but multiple. In each time slot used for TB PPDUs, each STA may use a different RU allocation. For this reason, the proposed trigger frame may include trigger information comprising the total number of consecutive solicited time slots N and/or their length $T_i$ (i=1, ..., N) and an RU schedule information $R_{i,j}$ (i=1, ..., N; j=1, ..., M). The RU schedule information $R_{i,j}$ defines which RU the addressed STA j should use in time slot i. A receiving STA which is addressed by such a trigger saves the RU schedule information until it expires or a new trigger including RU information is received.

The RU schedule information may e.g. be implemented by a table, in which rows define users j and columns define the number of subsequent time slots i. An exemplary table is shown below. It is assumed that there are N consecutive time slots, M addressed STAs, and four different RUs labelled by RU A, RU B, RU C, and RU D for simplicity. This table defines that STA 1 for example shall use RU A in first time slot and RU D in second time slot. Such a table may also hold blank entries, meaning that this STA does not transmit or is not addressed in this particular time slot. In general, a STA may have assigned multiple RUs in a time slot. To implement the signaling for multiple RUs in a time slot it may be appropriate to duplicate rows belonging to a particular STA.

| Addressed STA (identified by MAC address or AID) | time slot 1 | time slot 2 | ... time slot N |
|---|---|---|---|
| STA 1 | RU A | RU D | RU B |
| STA 2 | RU B | RU A | RU C |
| STA 3 | RU C | RU B | RU D |
| ... | | | |
| STA M | RU D | RU C | RU A |

This table or an equivalent signaling (as explained below) is included in the trigger frame for which reason it may be called trigger with schedule (TWS) information. SIFS after the TWS has been sent, the first time slot starts and addressed STAs transmit their data on the allocated RU, i.e. $R_{i=1,j}$. After $T_1$ passed, an idle period of SIFS is envisioned before the AP may transmit a downlink PPDU containing at least a continuation trigger (CT) indicating that the second time slot is pending SIFS after the end of the current downlink PPDU. Similar to the first time slot, the addressed STAs transmit a TB PPDU on the allocated RU, i.e. $R_{i=2,j}$, in the second time slot etc. The process of sending uplink TB PPDUs following a CT continues until the last time slot N has been reached and the STAs transmitted their last TB PPDUs followed by a downlink PPDU of the AP SIFS after the $N^{th}$ time slot.

Figure 5:
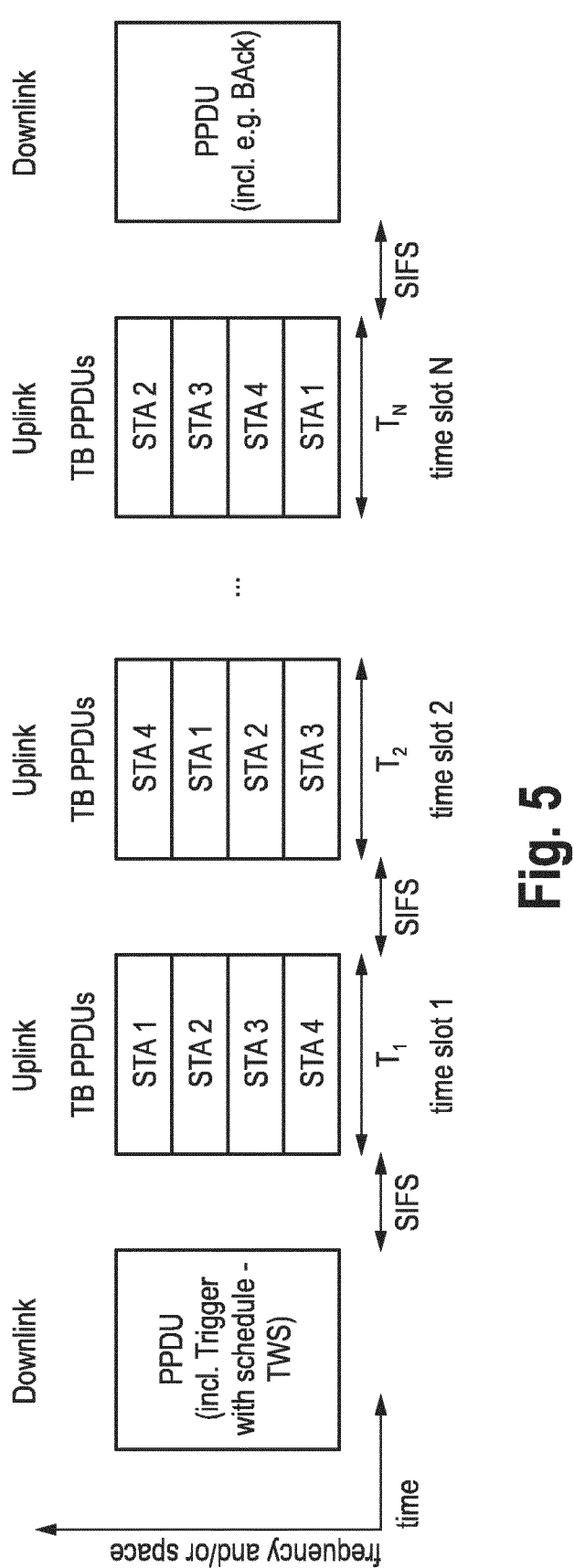
FIG. 5 shows a diagram illustrating a first embodiment of single-user downlink PPDU triggering a multiple uplink TB PPDUs according to the present disclosure.
Figure 6A:
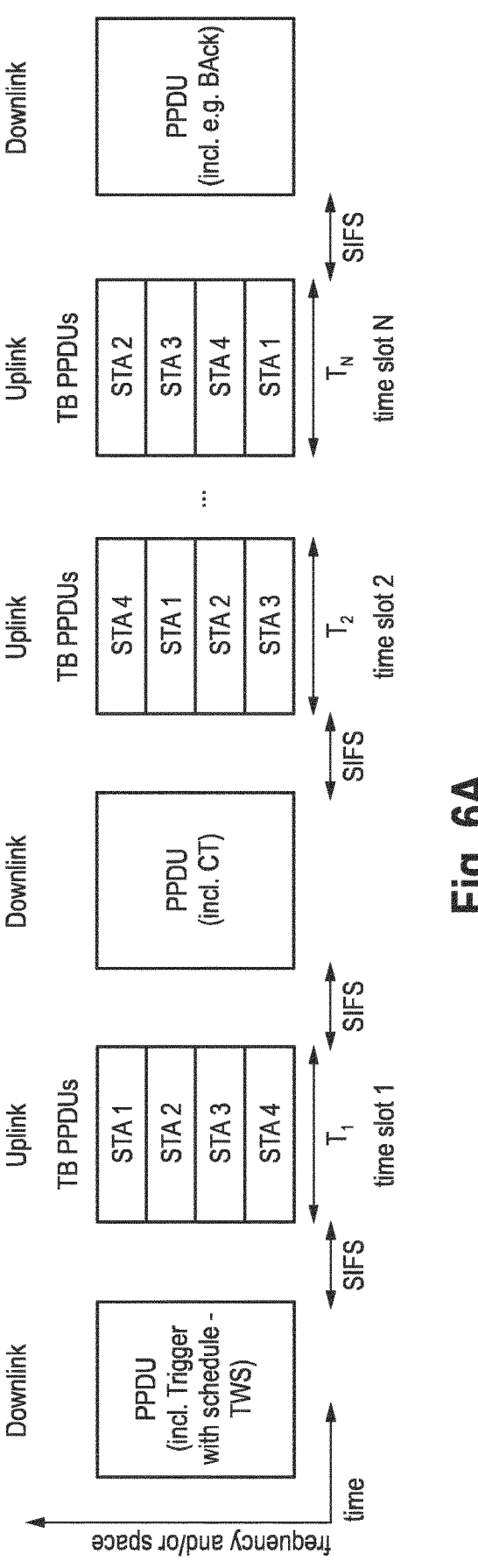
FIG. 6A shows a diagram illustrating a second embodiment of single-user downlink PPDU triggering multiple uplink TB PPDUs according to the present disclosure.
Figure 6B:
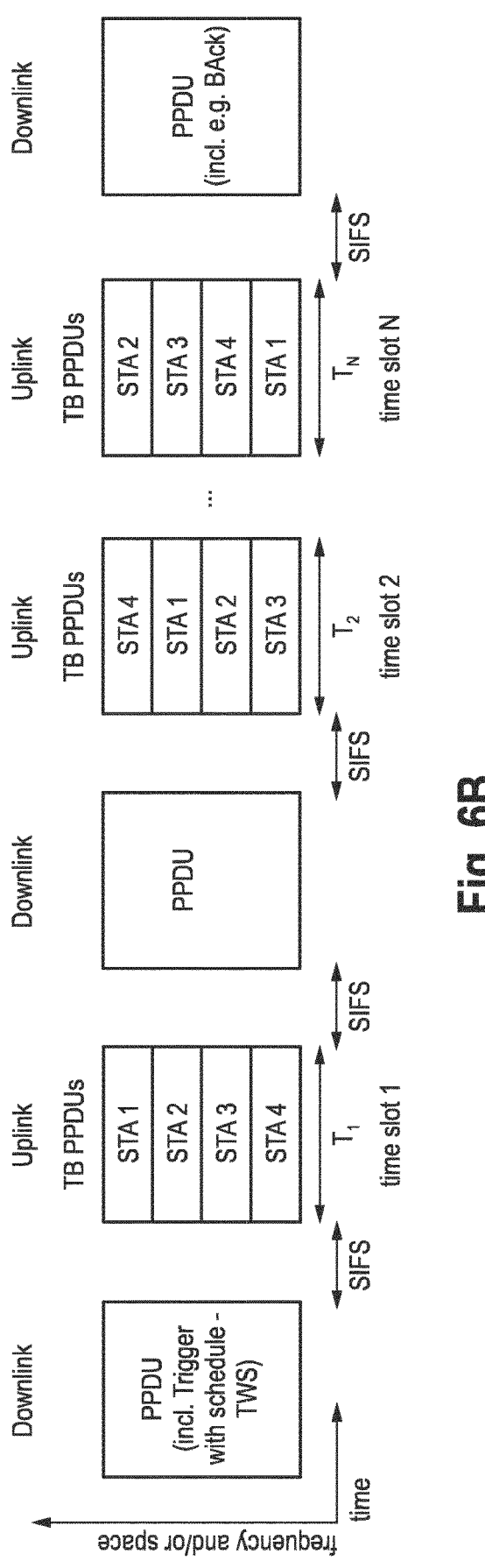
FIG. 6B shows a diagram illustrating a third embodiment of single-user downlink PPDU triggering multiple uplink TB PPDUs according to the present disclosure.

FIGS. 5, 6A and 6B visualize the process described before in diagrams showing exemplary channel access over multiple time slots when using trigger with schedule (TWS). Hereby, in the example illustrated in FIGS. 5 and 6B no CT is used and in the example illustrated in FIG. 6A a CT is used in downlink PPDUs following the first PPDU that includes the TWS. Different from the example illustrated in FIG. 5, the example illustrated in FIG. 6B uses downlink PPDUs in between uplink TB PPDUs, but—different from the example illustrated in FIG. 6A—without CT. The schedule included in the trigger corresponds to the table shown above with M=4 and N=4.

Two variants of the continuation trigger (CT) may be implemented:

(i) A continuation trigger (CT) frame: This frame should be very short and thus carrying only important information such as an identifier of the TWS, the index of the upcoming time slot i, upcoming TB PPDU length information $T_i$, and optionally STA identifiers (AID). The continuation frame is particularly suitable for SU PPDU transmission in downlink as shown in FIG. 6A.

Figure 8A:
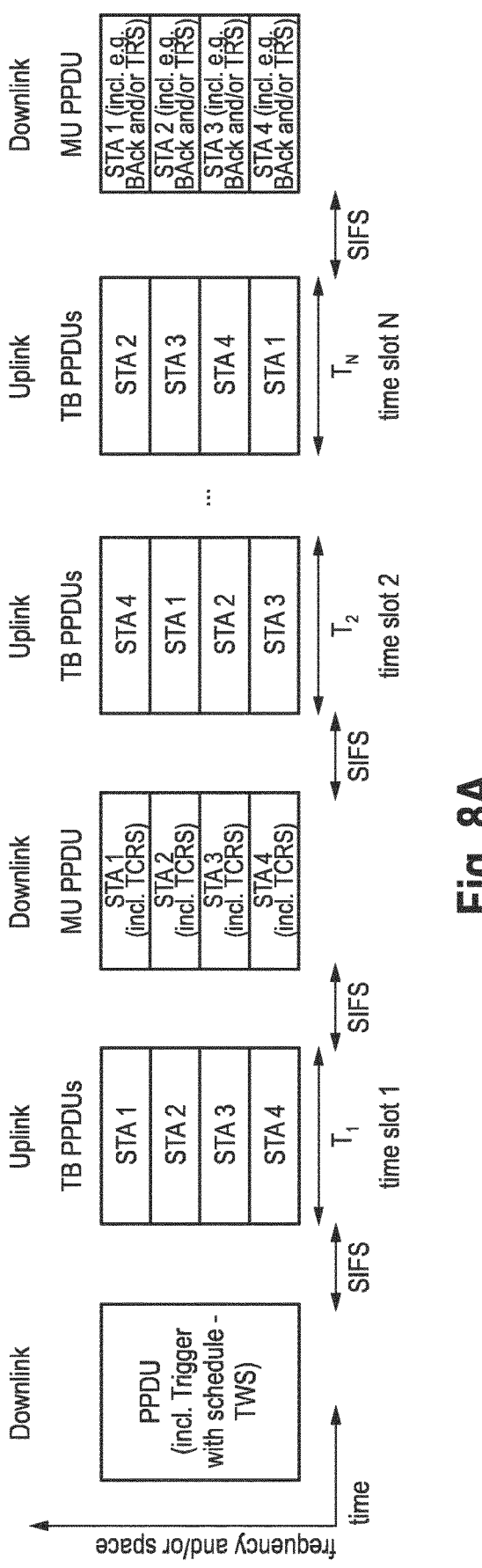
FIG. 8A shows a diagram illustrating a second embodiment of multi-user downlink PPDU triggering multiple uplink TB PPDUs according to the present disclosure.

(ii) A continuation trigger subfield (triggered continuation response scheduling—TCRS) which is part of the MPDU header. This subfield contains only an identifier of the TWS, the index of the upcoming time slot i and respective length $T_i$. This is particularly suitable for continuation triggering downlink MU PPDUs as shown in FIG. 8A explained below.

It shall be noted that the length $T_i$ in each CT may be replaced by total length information, i.e. the time span from the end of the PPDU holding the CT until the end of the last uplink time slot. The total length information of the CT which triggers time slot k, i.e. the downlink PPDU just before time slot k, is given by $$\sum_{i=k}^{N} T_i + \sum_{i=k+1}^{N} T_i^{DL} + (2(N-k)+1) \cdot T_{SIFS}, \text{ wherein } T_i^{DL}$$

denotes the duration of the downlink PPDU triggering time slot i. The total length information has the advantage that any STA receiving the CT may easily determine the end of the allocation and thus the next opportunity to access the channel.

If the schedule holds blank or empty RUs which may be used for uplink OFDMA random access (UORA), it is beneficial to signal in each CT the location of these RUs in the next/upcoming time slot.

The contents of CT or TCRS shall not contradict. For that reason, all CT or TCRS transmitted in a DL PPDU by an AP having same TWS identifier shall contain same $T_i$ and time slot index i. A more detailed list of parameters contained in each continuation trigger will be explained later.

Figure 7:
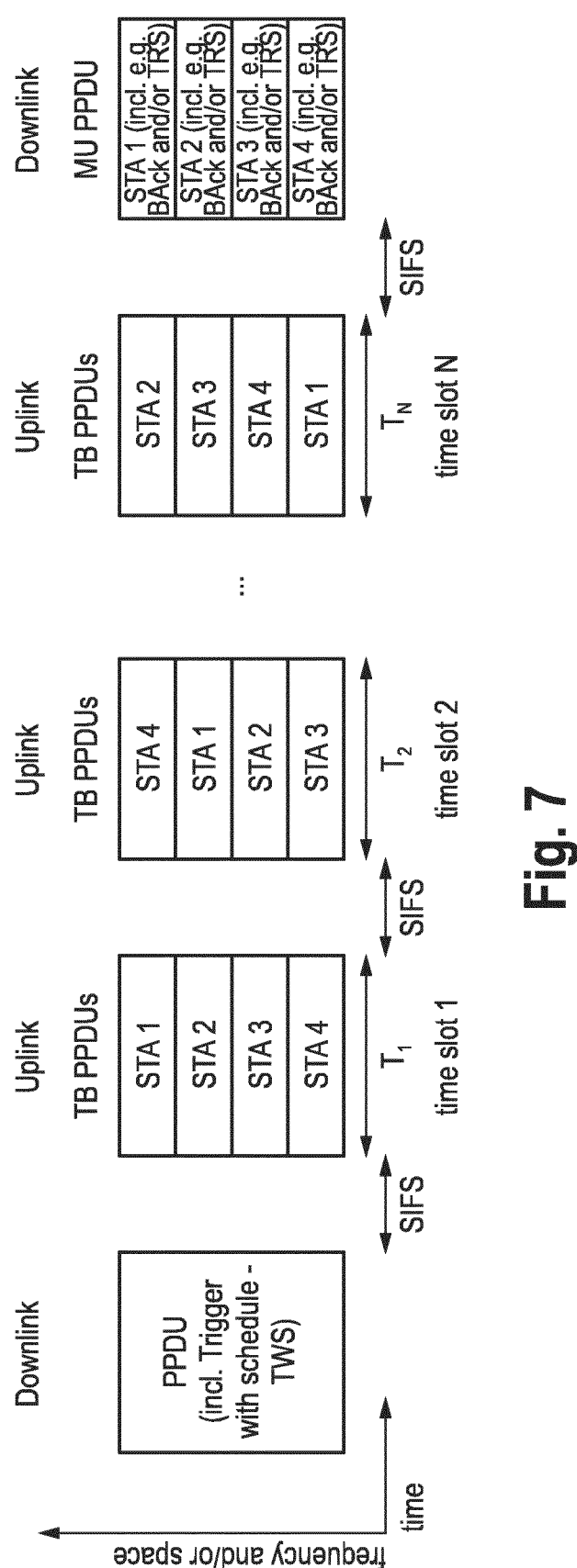
FIG. 7 shows a diagram illustrating a first embodiment of multi-user downlink PPDU triggering multiple uplink TB PPDUs according to the present disclosure.
Figure 8B:
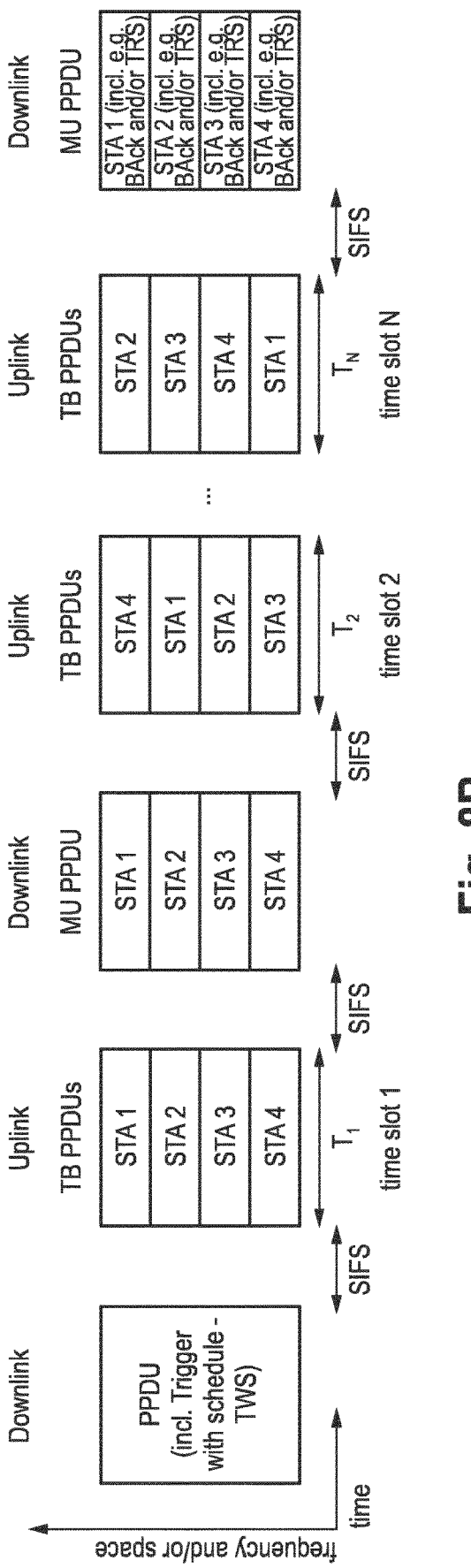
FIG. 8B shows a diagram illustrating a third embodiment of multi-user downlink PPDU triggering multiple uplink TB PPDUs according to the present disclosure.

FIGS. 5, 6A and 6B implement a frequency and/or spatial hopping in uplink only. In some scenarios it may be advantageous to do frequency and/or spatial hopping in downlink as well. FIGS. 7, 8A and 8B illustrate operation in this case by diagrams showing exemplary channel access over multiple time slots when using trigger with schedule (TWS) and MU PPDU in downlink. Hereby, in the example illustrated in FIGS. 7 and 8B no CT is used and in the example illustrated in FIG. 8A a CT in form of a TCRS is used in downlink PPDUs following the first PPDU that includes the TWS. Different from the example illustrated in FIG. 7, the example illustrated in FIG. 8B uses downlink PPDUs in between uplink TB PPDUs, but—different from the example illustrated in FIG. 8A—without CT in the form of a TCRS.

Since the TWS is of very large size, it is preferably transmitted as a SU PPDU in e.g. multi or broadcast mode. As shown in FIGS. 5, 6A and 6B, this PPDU triggers the first UL PPDU time slot, which is followed by a downlink MU PPDU. In one embodiment this PPDU contains at least one TCRS for each addressed STA triggering the second UL PPDU time slot and so forth. It should be noted that MU PPDU RU allocation in downlink is defined in each header/preamble of the MU PPDU by the AP independently of the RU allocation in the TWS. Thus, RU allocation in downlink and uplink may differ.

After the $N^{th}$ time slot, the AP may choose to transmit a last MU PPDU in order to have the same number of downlink and uplink time slots sent with an MU PPDU. This MU PPDU may include a BAck for transmitted uplink data and/or a TRS subfield in order to solicit a BAck response of the previously transmitted downlink data.

In case the AP would like to stop or terminate the TWS allocation several methods may be envisioned:

(i) The AP may send a PPDU in downlink including signaling, e.g. a special variant of a TWS, to indicate that this allocation stopped. Such an indication may be send at any time when the AP has channel access.

(ii) The AP may define a timeout value in the TWS indicating how long the schedule in the TWS is valid.

(iii) The AP may define in the TWS that the TWS allocation ends automatically when the last time slot N is reached.

When STAs receive any of such indications and the indication conditions are met, they shall not respond to any continuation trigger type, unless they received a new TWS. For STAs to identify which schedule is current and which is addressed by a continuation trigger, the TWS frame shall have an identifier or dialog token which identifies the settings and information within each TWS. This identifier is also present in each CT or TCRS. This allows concurrent allocations with TWS.

Figure 9:
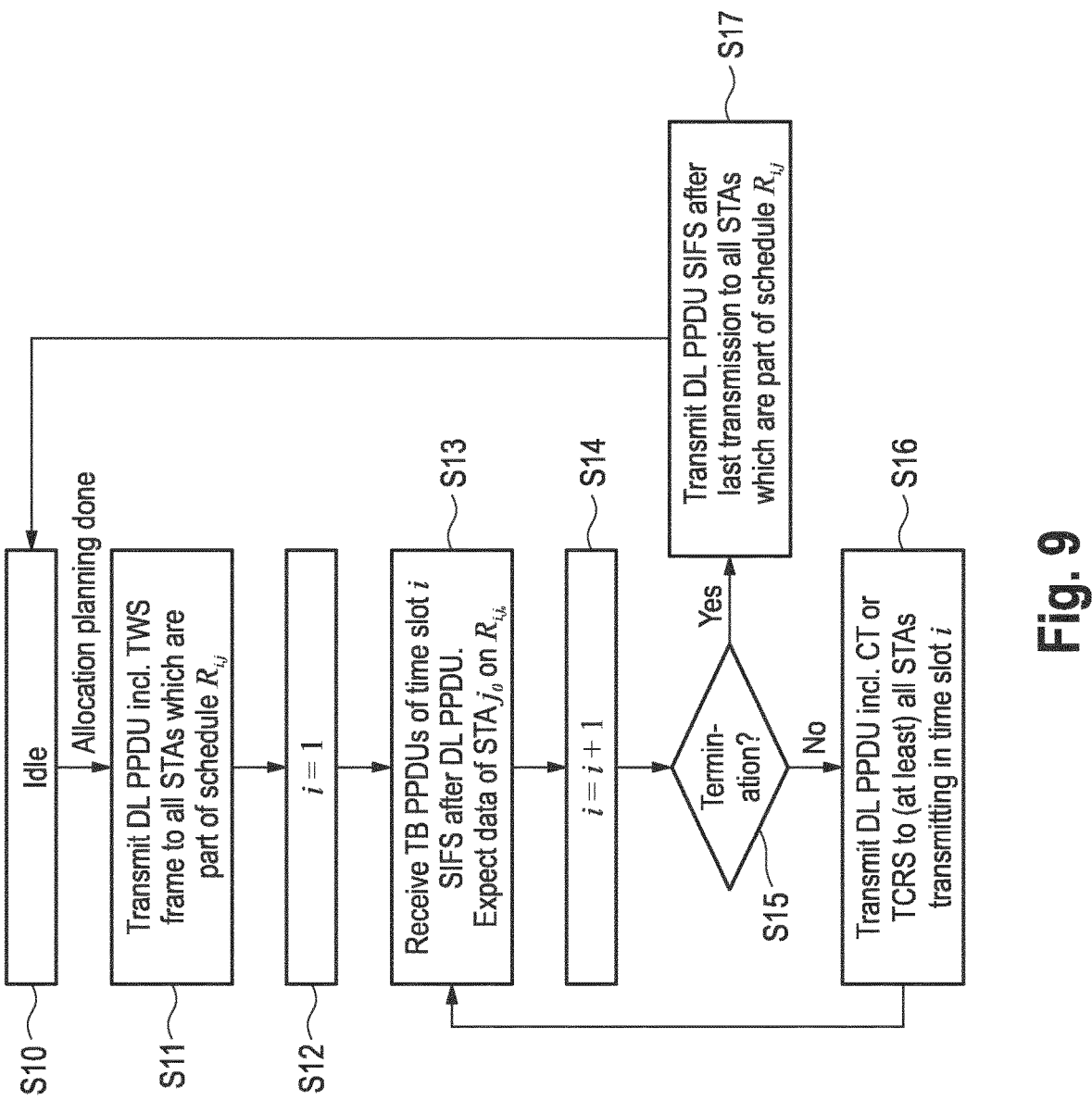
FIG. 9 shows a flow chart of an embodiment of channel access by an AP.
Figure 10:
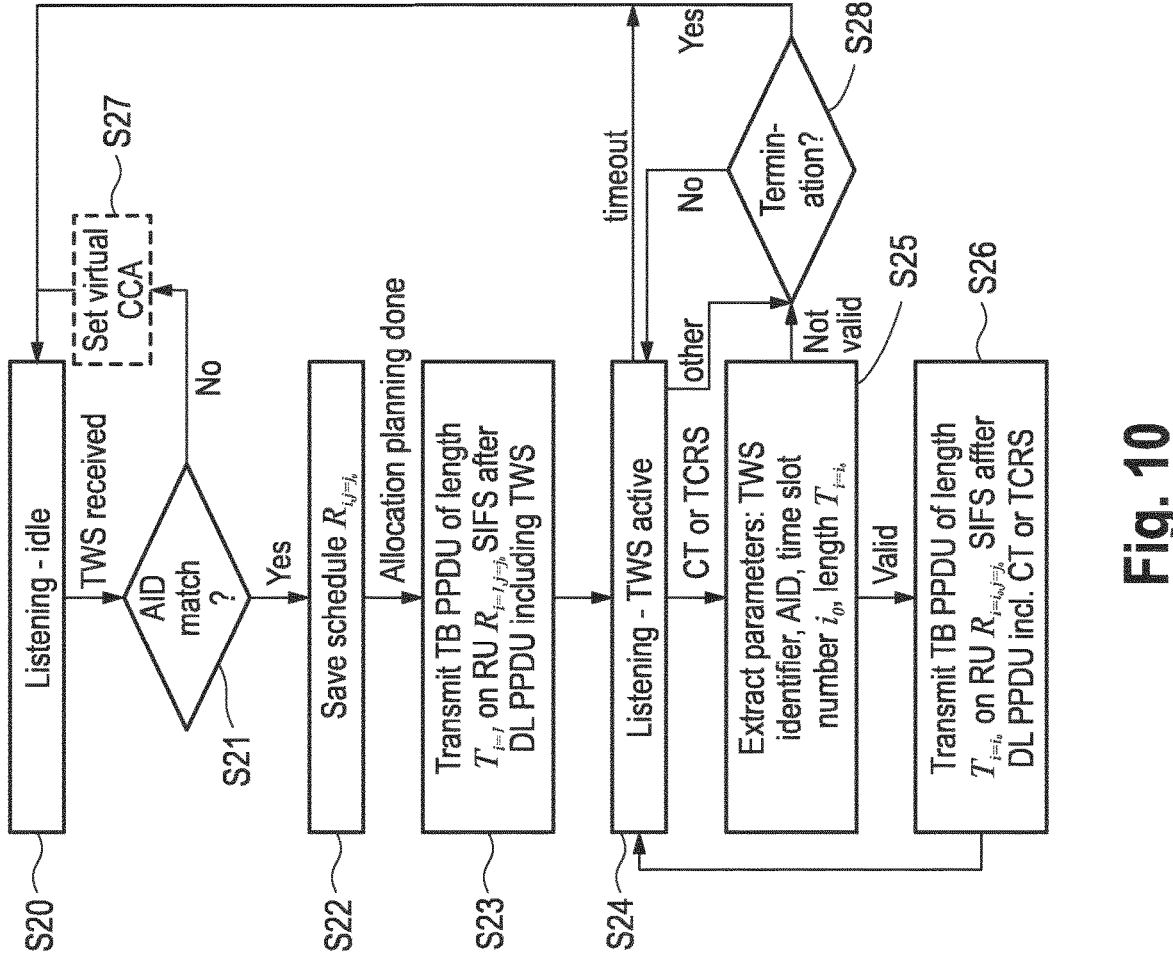
FIG. 10 shows a flow chart of an embodiment of channel access by an STA.

FIGS. 9 and 10 show exemplary channel access flow charts for an AP STA (herein also referred to as AP or first communication device) and non-AP STAs (herein also referred to as STAs or second communication devices), respectively. Both flow charts implement a baseline PPDU exchange as shown in FIGS. 6A and 8A. Similar flow charts apply for variants and extensions described above or below.

As shown in FIG. 9, the AP is in idle mode at the beginning (S10) and may perform other tasks requiring the RF radio, e.g. transmit or receive other PPDUs. When allocation planning is done, the AP transmits (S11) a downlink PPDU including one or more TWS frames which hold the schedule $R_{i,j}$. SIFS after the end of this PPDU, the AP initializes a time slot counter i (S12) and receives (S13) the TB PPDUs of the first time slot on the RU assigned to STAs in the TWS. Subsequently, the AP increments the time slot counter i by one (S14) and checks (S15) if a termination of the allocation is appropriate. If not, the AP transmits (S16) another downlink PPDU including either a CT frame or a TCRS to at least all STAs which are supposed to transmit in next time slot which starts SIFS after this PPDU, i.e. have a non-blank entry in the RU table. In case the AP decides to terminate or if the schedule ends, the AP transmits (S17) a final downlink PPDU. This PPDU is addressed to all STAs which are part of the schedule $R_{i,j}$ and may include a termination signaling of the TWS.

The counterpart flow chart implemented in (non-AP) STAs in shown in FIG. 10. At the beginning, the STA is in listening mode (S20) and may perform other tasks until a TWS is received. When the TWS is received, the STA checks (S21) if it is addressed by the TWS by matching its own AID with the AIDs of the TWS. If there is a match, STA $j_0$ saves (S22) its schedule $R_{i,j_0}$ and transmits (S23) in the first time slot on the assigned RU $R_{1,j_0}$. If $R_{1,j_0}$ is blank, the STA shall not transmit. After that, the STA stays in listening mode (S24) and may perform other tasks until a frame including a CT or TCRS is received. When such a frame is received, contents are extracted and verified (S25) and if valid STA $j_0$ transmits (S26) a TB PPDU in time slot $i_0$ of length $T_{i_0}$ on RU $R_{i_0,j_0}$ if non-blank. If a TWS is received with an AID which does not match the STA AID (as checked in step S21), the STA may set (S27) its virtual CCA to the length indicated in the TWS and should refrain from media access during this time span. If the contents extracted and verified in step S25 are not valid, it may be checked (S28) if a termination of the allocation is appropriate. If not, the process continues with listening in step S24; otherwise the process continues with listening in step S20.

Figure 11:
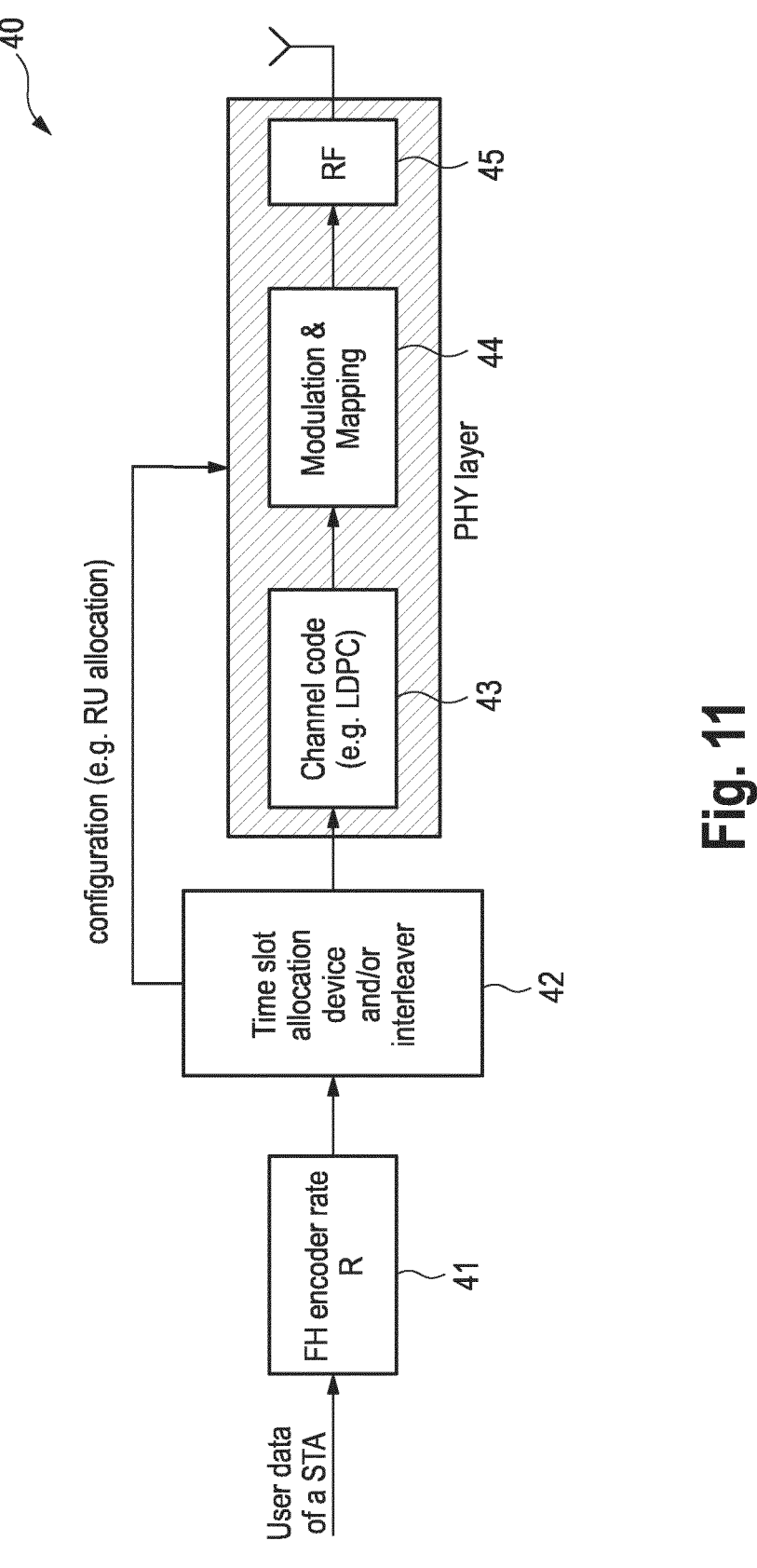
FIG. 11 shows a schematic diagram of another embodiment of a communication device operated as AP or STA illustrating user data encoding.

User data encoding for a particular STA is basically arbitrary but for frequency hopping diversity a frequency-hopping (FH) encoder with a rate R<1 may be applicable. FIG. 11 shows a schematic diagram of an embodiment of a communication device 40, which may be operated as AP or STA. The communication device 40 comprises an FH encoder 41 of rate R, which encodes user data. The output of the FH encoder 41 is processed by a time slot allocation unit 42, which assigns data portions to time slots and configures the PHY layer for transmission in the respective time slots, e.g. modulation and coding (MCS) parameters and RU allocation. On the PHY layer (residing e.g. in the wireless communication unit 32 shown in FIG. 2) a channel coding unit 43 performs channel coding (e.g. using an LDPC code), a modulation and mapping unit 44 performs modulation and mapping, and a transmission unit 45 performs RF transmission of the final data stream.

In a simple but efficient implementation, the FH encoder 41 performs a duplication of the user data in the sense that the time slot allocation device 42 assigns a copy of the user data to each time slot with a different RU. In the special case that M STAs share equally N=M time slots with M RUs, rate R of the FH encoder 41 is R=1/M.

Figures 12A, 12B:
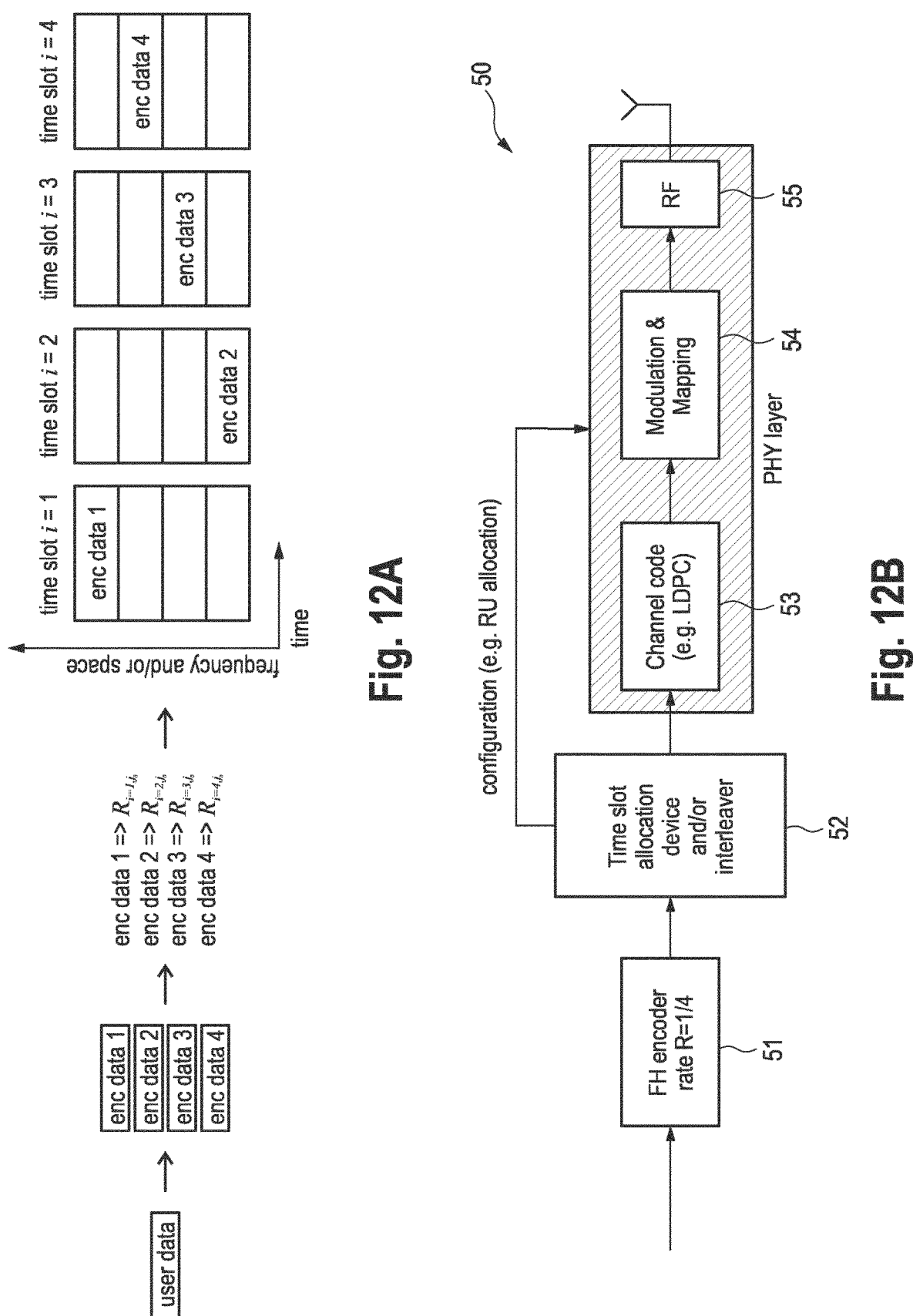
FIG. 12 shows a schematic diagram of another embodiment of a communication device operated as STA illustrating user data encoding at rate 1/4.

An example of the FH encoder operation for STA $j_0$ is given in FIG. 12 showing a diagram illustrating another embodiment of user data encoding (FIG. 12A) and a schematic diagram of a corresponding communication device 50 (FIG. 12B), which may be operated as STA. A user data block intended to be sent in a single PPDU, i.e. a MPDU or A-MPDU (Aggregate MPDU, i.e. more than one MPDU) on MAC layer, is encoded by a FH encoder 51 of rate 1/4. The FH encoder 51 adds 4-fold redundancy, resulting in 4-fold encoded data blocks. The time slot allocation unit 52 configures the PHY layer such that a particular encoded data block is transmitted on an assigned RU at a time slot. In the example, the first encoded data block is assigned to $R_{i=1,j_0}$. If the time slot allocation unit 52 performs an interleaving operation in addition, the first encoded data block may be assigned to an RU for a time slot different than the first one. FIG. 12A shows the PHY layer output of STA $j_0$ on the right. The channel coding unit 53 performs channel coding, and the modulation and mapping unit 54 modulates the waveform only for the assigned RU. Other RUs are not modulated and may be used by other STAs modulating their assigned RUs. The final data stream is transmitted by the RF transmission unit 55.

It shall be noted that the PPDU transmission may comprise waveforms which exceed an RU and may cover neighboring RUs. This is for example the case for legacy preambles. The symbolic illustration in FIG. 12, however, omits such waveforms and focuses on the data part waveforms only.

The configuration of the FH encoder is in principle individual for each STA and for each communication direction, i.e., downlink and uplink. The configuration shall be supported by both AP and peer STA; hence, a negotiation or capability verification as well as a signaling between a STA pair is preferred. The configuration signaling may be as part of the TWS frame or in a separate frame or implicitly in a special variant of the TWS frame. A separate frame should be preferably used as it may configure downlink and uplink, whereas the TWS frame may configure the uplink only.

If an FH encoder is used, it may be appropriate to change the Ack/BAck behavior. Conventionally, every MPDU or MSDU or A-MSDU is acknowledged individually (Ack) or in groups (BAck). When an FH encoder is applied it makes sense to acknowledge the input data of the FH encoder, i.e. the data labeled "user data of a STA" in FIG. 11. Thus, the receiver first performs FH decoding before it checks user data for errors and acknowledges said user data.

Figure 13:
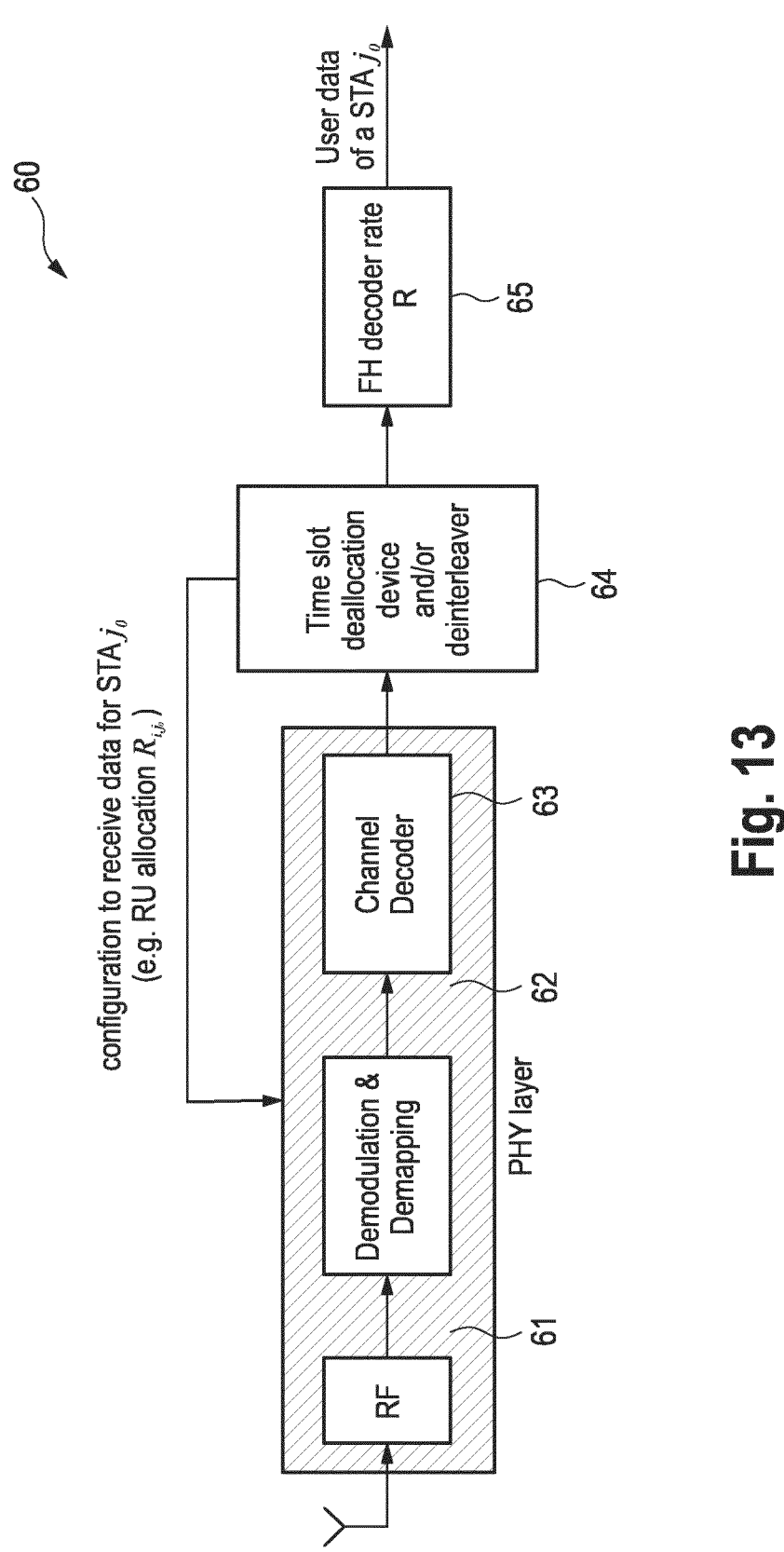
FIG. 13 shows a schematic diagram of another embodiment of a communication device operated as AP or STA illustrating user data decoding.

FIG. 13 shows a schematic diagram of a communication device 60, which may be operated as AP or STA. It comprises an RF receiver 61, a demodulation and demapping unit 62, a channel decoding unit 63, a time slot deallocation unit 64 and an FH decoder 65. The user data decoding corresponds to the user data encoding performed in the communication device 40 shown in FIG. 11. The FH decoder 65 detects data of STA $j_0$. In a scenario, where the received data is a multiplex of user data from various STAs, the FH decoder 65 needs to be duplicated for each STA in the most general case.

In the following different variants and extensions to the disclosure will be described.

In a variant of the TWS frame the schedule may not be present in form of a table but in form of a function. Applicable functions include a round robin RU schedule. In this case each STA gets assigned an initial RU signaled by a countable identifier. The STAs use their respective initial RU for the first time slot. The RU assigned for the second time slot is derived by a circular shift of RU identifiers. By doing so, an RU allocation similar to the table described above can be achieved at a significant less signaling overhead. Implementation of this procedure may require the trigger to carry an indication of the function (e.g. round robin), function parameters (e.g. direction of the circular shift, maximum RU identifier after which the wrap around occurs), and initial RU configuration.

In a variant of the continuation trigger information, the length of TB PPDUs in each time slot may be same, i.e. $T_i=T$ for all i. In this case signaling of $T_i$ in each continuation trigger is optional. In another variant, variation of modulation and coding scheme (MCS) parameters such as code rate and constellation diagram may be dealt with. The MCS affects the length of a PPDU, and since all TB PPDUs within a time slot shall have same length, restriction to the applicable MCS apply. In case the length of the TB PPDU would not be met under a certain MCS setting, STAs may apply padding, i.e. insertion of a predefined data sequence at the end of the PSDU so that length requirements are met. MCS may then be signaled in the continuation trigger.

There are different variants of channel access elicited by a TWS. In a first variant channel access without any continuation trigger type in downlink PPDUs is feasible in principle. In this case, the TWS includes information that a continuation trigger is not required for continuation of the time slots. Since it is important that all STAs continue the RU allocation to the next time slot, the AP may address all STAs that are addressed in the TWS with its downlink PPDU. For this reason, the downlink PPDU may be a MU PPDU or a multi STA response frame such as multi STA block ACK which functions as a continuation trigger. This version of channel access corresponds to the embodiments shown in FIGS. 6B and 8B where the continuation trigger is missing.

Figure 14:
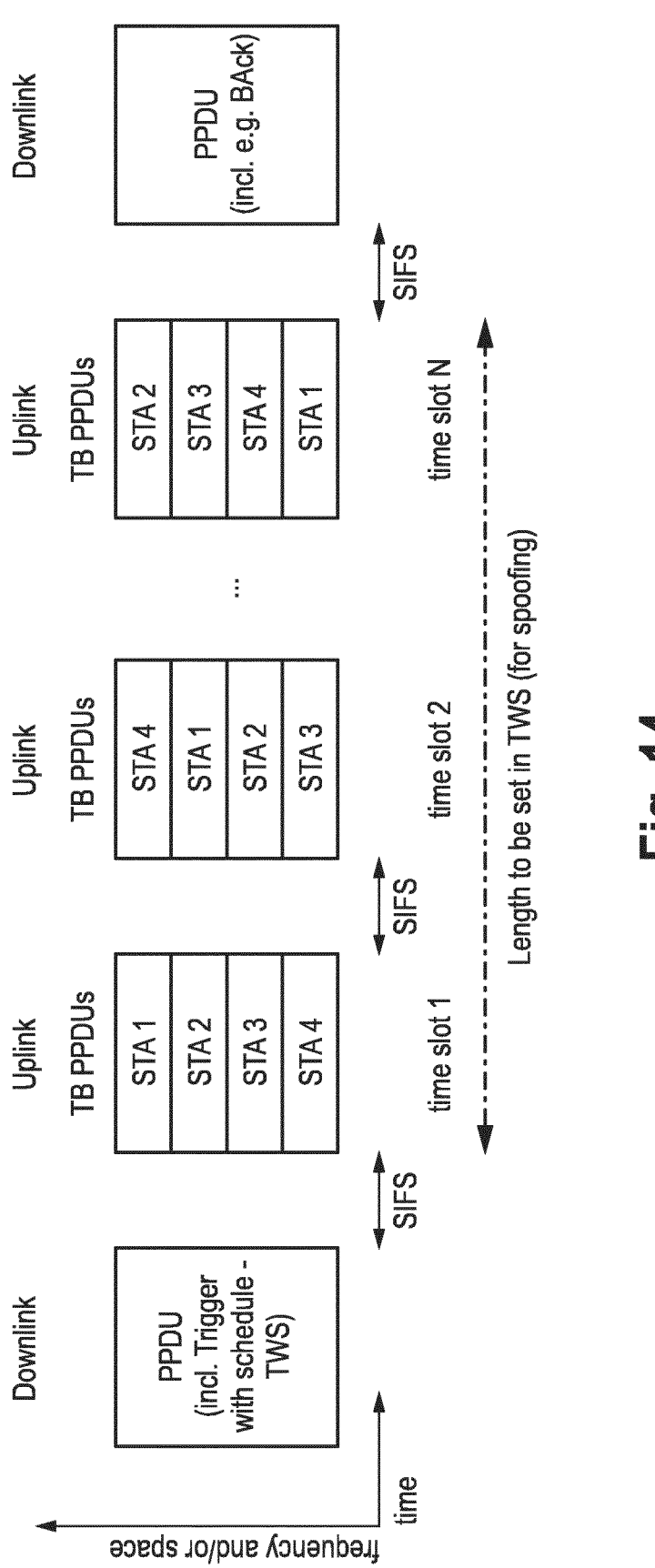
FIG. 14 shows a diagram illustrating another embodiment of uplink only channel access according to the present disclosure.

In another variant of channel access elicited by a TWS, the channel access with no downlink in between time slots is illustrated in FIG. 14 showing a diagram illustrating another embodiment of uplink only channel access according to the present disclosure. SIFS after the downlink PPDU including a TWS frame, STAs addressed in time slot 1 transmit their TB PPDUs. SIFS after time slot 1 has passed, STAs addressed in time slot 2 transmit TB PPDUs. This process continues until the $N^{th}$ time slot and the AP may conclude the allocation by a downlink transmission including a BAck to confirm the successful reception of the received data sent in all TB PPDUs. Similar to FIG. 7 the AP may consider transmission of an MU PPDU after the $N^{th}$ time slot. No continuation trigger is sent by AP for which reason the AP should consider to use virtual channel access procedures such as (MU-)RTS/CTS or CTS-to-self. It shall be understood that what happens in between TWS PPDU and PPDU with BAck is a placeholder. This may also be applied to the operation illustrated in FIGS. 5, 6A, 6B, 8A and 8B.

Since the PPDU exchange shown in FIG. 14 differs from what an 802.1 lax STA would expect, i.e. a single TB PPDU time slot after a downlink PPDU, some sort of spoofing is appropriate. Each trigger frame indicates the length of the upcoming TB PPDU transmission slot. For operation according to the scheme illustrated in FIG. 14, this length field may be set to the length of all time slots including SIFS times except the first and the last SIFS. The respective time interval is indicated in FIG. 14 by the dash-dotted line. This prevents other STAs, which are not part of the current allocation, to access the medium in case they do not receive the TB PPDUs (hidden node problem).

In another variant of channel access elicited by a TWS, a conditional continuation trigger for applications such as closed-loop ARQ may be used. Often the decision to elicit a further uplink time slot is drawn and can be drawn only when the received data has been evaluated and MPDUs are found to be in error. For these applications a TWS with a conditional continuation trigger may be used, which works as follows.

First, a downlink PPDU including a TWS frame is transmitted. SIFS after this trigger, all addressed STAs transmit a TB PPDU in uplink. The RU allocation corresponds to the allocation in the first time slot given by the TWS. SIFS after the $1^{st}$ time slot ended, the AP transmits a downlink PPDU including a BAck frame indicating status of reception of the previously received data. Following the BAck, the AP transmits a conditional continuation trigger which triggers a $2^{nd}$ time slot for that STAs which have a need to (re)transmit MPDUs. The STAs, which are addressed by the conditional continuation trigger, transmit SIFS after the downlink PPDU ended TB PPDUs in uplink preferably retransmitting erroneous MPDUs. Thereby, STAs are using the RU allocation given in the TWS, which initiated the current frame exchange. RUs belonging to STAs that have not been addressed by a continuation trigger are idle or may be used for random access. In case of random access, STAs may access RUs, indicated to be suitable for random access (e.g. indicated as blank), although they have not received an explicit request by a trigger frame or TRS subfield.

It shall be noted that the TWS may hold scheduling information for more than one time slot for every STA addressed by the trigger. The schedule is conditional in the sense that only a part of the addressed STAs execute the schedule in the $2^{nd}$ and following time slots. The indication is done by the conditional continuation trigger.

Figure 15:
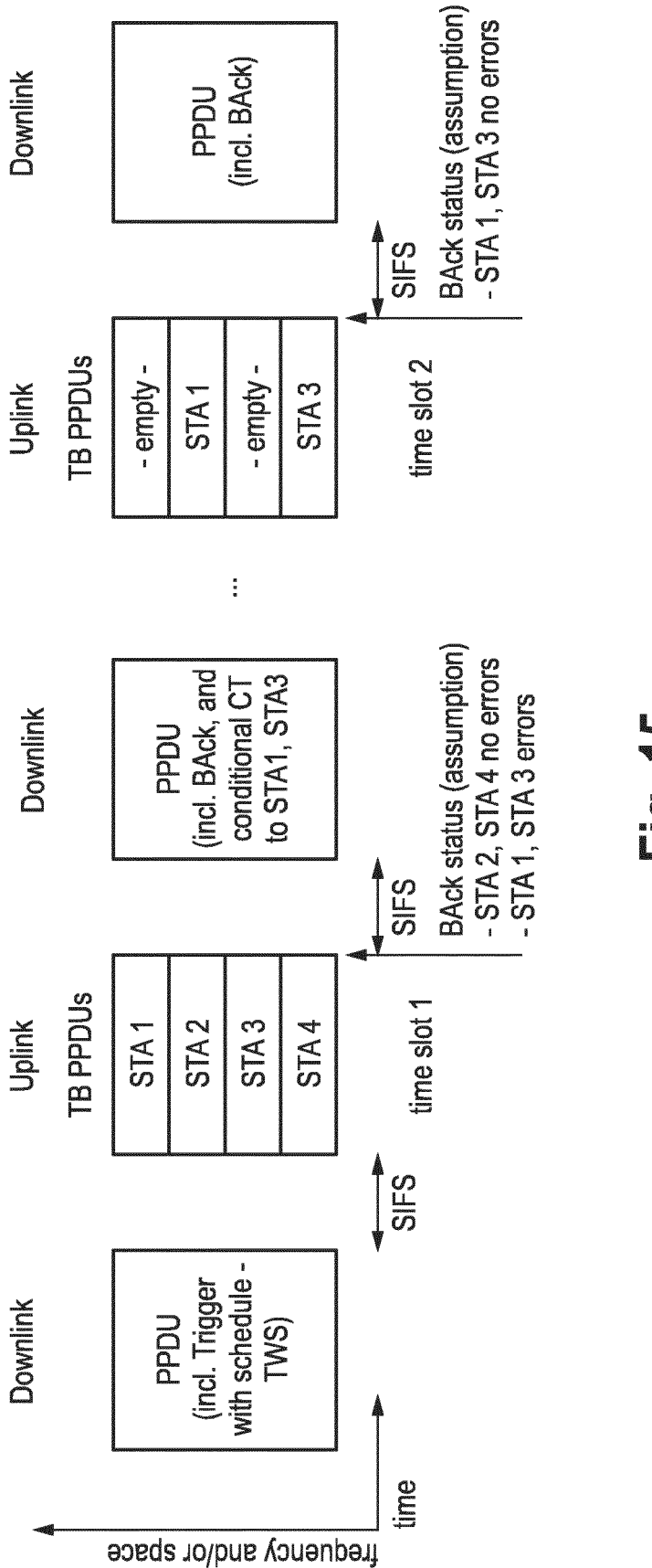
FIG. 15 shows a diagram illustrating another embodiment of channel access according to the present disclosure using BAck operation with conditional continuation trigger.

FIG. 15 shows an example for the operation described above, in particular a diagram illustrating another embodiment of channel access according to the present disclosure using BAck operation with conditional continuation trigger. It is assumed that the TWS holds RU allocation information for 4 STAs in total and at least two time slots. Furthermore, data of STA 1 and STA 3 are assumed to be erroneously received in $1^{st}$ time slot and need a retransmission in the $2^{nd}$ time slot. The RUs, which would have been allocated to STA 2 and STA 4, are empty and available for other purposes such as random access.

According to embodiments of the present disclosure the TWS may hold common and specific parameters of the series of time slots. The common parameters define the structure of the TB PPDUs and are valid for all STAs. Such parameters may comprise one or more of the following parameters:

Communication standard specific parameters:
  Structure, length and/or periodicity of channel estimation sequences
  Coding parameters such as encoding type (e.g. LDPC or BCC)
  Aggregate bandwidth of all TB PPDUs
  Carrier sense type for TB PPDUs (e.g. direct access or listen before talk)
  Power control information such as AP transmit power to compensate e.g. near-far effect or to implement spatial reuse
  General modulation parameters such as guard interval length and/or modulation formats
  Spatial precoding type (e.g. STBC)
Trigger variant to identify different trigger types
Trigger frame identifier
Number of time slots defined in schedule
Whether a continuation trigger frame will be sent and/or its periodicity (e.g. after each UL TB PPDU or after N UL PPDUs)
Whether the following CTs contain static information (e.g., are used only for synchronization purposes, indicating next time slot) or whether they contain updated information (e.g., updated list of free RUs)
Length:
  Length of each time slot (if length is not indicated in continuation trigger). May be one parameter if length is same for all time slots
  Aggregate length, i.e. sum of lengths of each time slot (if length is indicated in continuation trigger)
  Spoofing length, i.e. aggregate length—2×SIFS (if uplink only channel access is present)
RU schedule type, e.g. table or function
Initial RU schedule (only present if applicable, see below)
Termination condition e.g. explicit frame, timeout and/or last time slot reached In contrast, the specific parameters define the TB PPDU of a particular STA. The STA specific parameters are signaled for each addressed STA. Such parameters may comprise one or more of the following parameters:
STA identifier, e.g. AID or MAC address
Modulation coding scheme (MCS) (if not part of continuation trigger)
Power control information such as target RSSI in Uplink (if not part of continuation trigger)
Spatial configuration, e.g. number of spatial streams and/ or spatial precoder to be applied FH encoding settings, e.g. enabled/disabled, code type, code rate STA specific RU assignment which may be one of the following:

RU assignment for each time slot $R_{i,j=j_0}$, i.e. a row of the above table

Indication of RU assignment function and required parameters

Assignment to a resource defined by the initial RU schedule valid for the first time slot and a related function for the second and following time slots (only present if initial RU schedule is present in common trigger with schedule).

It shall be noted that some parameters are also present in a trigger signaling for a single UL time slot.

The continuation trigger, regardless if it is a CT frame or a TCRS subfield, may comprise common information including one or more of the following:

Identifier of the trigger frame

Time slot index of next uplink phase or alternatively a count-down index starting at highest value counter towards zero Length information:

Length of next time slot (in this case overall length is signaled in common parameters of trigger with schedule)

Total length information, i.e. the time span from the end of the PPDU holding the CT until the end of the last Uplink time slot Information of empty or blank RU intended for UORA in the next or upcoming time slot.

The continuation trigger may contain STA specific information if needed. These parameters may comprise one or more of the following parameters:

AID (only present for a conditional CT or if any STA specific parameter is signaled in CT and not present at all in a TCRS; in the latter case, the AID is defined in header-B of the PPDU comprising the TCRS)

MCS (if not part of STA specific parameters of TWS frame)

Power control information such as target RSSI in Uplink (if not part of STA specific parameters of TWS frame).

The proposed concept is in particular suitable for but not limited to ultra-reliable low latency communications achieved by frequency-hopping diversity and/or low-latency ARQ feedback. The proposed concept includes the following elements, which may be used independently and separately in various combinations and various embodiments:

Concept to elicit uplink communications for more than one time slot

Trigger carrying schedule information, i.e. RU-STA allocation for multiple time slots Continuation trigger to solicit uplink communications in next time slot of schedule Frequency hopping encoder on A-MPDU or PPDU level Modified acknowledgement behavior when frequency hopping encoder is applied Various variants of and signaling proposal to implement the proposed concept Thus, the foregoing discussion discloses and describes merely exemplary embodiments of the present disclosure. As will be understood by those skilled in the art, the present disclosure may be embodied in other specific forms without departing from the spirit or essential characteristics thereof. Accordingly, the disclosure of the present disclosure is intended to be illustrative, but not limiting of the scope of the disclosure, as well as other claims. The disclosure, including any readily discernible variants of the teachings herein, defines, in part, the scope of the foregoing claim terminology such that no inventive subject matter is dedicated to the public.

In the claims, the word "comprising" does not exclude other elements or steps, and the indefinite article "a" or "an" does not exclude a plurality. A single element or other unit may fulfill the functions of several items recited in the claims. The mere fact that certain measures are recited in mutually different dependent claims does not indicate that a combination of these measures cannot be used to advantage.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure. Further, such a software may also be distributed in other forms, such as via the Internet or other wired or wireless telecommunication systems.

The elements of the disclosed devices, apparatus and systems may be implemented by corresponding hardware and/or software elements, for instance appropriated circuits. A circuit is a structural assemblage of electronic components including conventional circuit elements, integrated circuits including application specific integrated circuits, standard integrated circuits, application specific standard products, and field programmable gate arrays. Further a circuit includes central processing units, graphics processing units, and microprocessors which are programmed or configured according to software code. A circuit does not include pure software, although a circuit includes the above-described hardware executing software.

It follows a list of further embodiments of the disclosed subject matter:

1. A first communication device comprising circuitry configured to simultaneously communicate with a group of two or more second communication devices, the circuitry being configured to generate schedule information that schedules, for two or more subsequent time slots, the assignment of different resource units to the second communication devices of the group of second communication devices to indicate, per time slot or per group of time slots, which second communication device of the group shall use which resource unit for data transmission, transmit the schedule information to the group of second communication devices, and receive data in subsequent time slots from second communication devices of the group that use the resource units according to the assignment scheduled by the schedule information for data transmission.

2. The first communication device as defined in embodiment 1, wherein the circuitry is configured to generate trigger information that indicates one or more of the total number of time slots for which the schedule information schedules the assignment of different resource units, the length of time slots for which the schedule information schedules the assignment of different resource units, if data transmitted in subsequent time slots are separated with a time distance and/or by data transmission by the first communication device, and if a continuation trigger in data transmission by the first communication device is required to proceed to a next time slot.

3. The first communication device as defined in embodiment 2, wherein the circuitry is configured to include the trigger information and the schedule information in a trigger frame transmitted.

4. The first communication device as defined in embodiment 2 or 3, wherein the trigger information further includes one or more of the modulation coding scheme to be applied by the second communication devices to the data to be transmitted, power control parameters to be applied by the second communication devices, and parameters configuring a physical layer of the second communication devices to be applied for the data to be transmitted.

5. The first communication device as defined in any one of the preceding embodiments, wherein the circuitry is configured to generate the schedule information in the form of a table or function and, in case of a function, information indicating the kind of function and/or an initial value of the function.

6. The first communication device as defined in any one of the preceding embodiments, wherein the circuitry is configured to generate the schedule information in the form of a table comprising one or more entries indicating that the corresponding second communication device does not transmit data or is not addressed in corresponding time slot and/or that the corresponding resource unit is available for use by any other second communication devices.

7. The first communication device as defined in any one of the preceding embodiments, wherein the circuitry is configured to transmit, after receiving data from second communication devices in one or more time slots, continuation trigger information indicating one or more of an indication of the schedule information to which the continuation trigger applies;

the number and/or length of the following one or more time slots;

that the schedule information still applies;

at least part of the schedule information and/or trigger information that applies to the following one or more time slots; and the second communication devices to which the continuation trigger information applies.

8. The first communication device as defined in embodiment 7, wherein the circuitry is configured to transmit the continuation trigger information in a continuation trigger frame or in a continuation trigger subfield of a header of a transmitted protocol data unit containing the continuation trigger information.

9. The first communication device as claimed in any one of the preceding claims, wherein the circuitry is configured to stop the application of schedule information by transmitting a stop signaling or including a timeout value into the schedule information or indicating that the application of the schedule information stops after the last time slot for which an assignment is included in the schedule information.

10. The first communication device as defined in any one of the preceding embodiments, wherein the circuitry is configured to receive data units, into which data transmitted by a second communication device are encoded, from different time slots and/or different resource units according to the schedule information for said second communication device and to decode the data from the received data units.

11. The first communication device as defined in embodiment 10, wherein the circuitry is configured to verify the status of reception and/or transmit an acknowledgement of the data after decoding them from the received data units.

12. The first communication device as defined in any one of the preceding embodiments, wherein the circuitry is configured to transmit, after receiving data from second communication devices in one or more subsequent time slots, conditional continuation trigger information indicating, for one or more subsequent time slots, which resource units are assigned to second communication devices for retransmission of data and/or which resource units are unused and/or available for use by other second communication devices.

13. A second communication device comprising circuitry configured to communicate with a first communication device that is configured to simultaneously communicate with a group of two or more second communication devices, the circuitry being configured to receive schedule information that schedules, for two or more subsequent time slots, the assignment of different resource units to the second communication devices of the group of second communication devices to indicate, per time slot or per group of time slots, which second communication device of the group shall use which resource unit for data transmission, and transmit data in subsequent time slots using the resource units according to the assignment scheduled by the schedule information for the second communication device.

14. The second communication device as defined in embodiment 13, wherein the circuitry is configured to transmit data after the schedule has been received on the resource unit assigned in a first time slot, and/or transmit data in further time slots on corresponding resource units defined by the schedule information either after the previous time slot, or after a response from the first communication device has been received after the previous time slot, or after a response from the first communication device containing a continuation trigger which addresses the second communication device has been received after the previous time slot.

15. The second communication device as defined in embodiment 13 or 14, wherein the circuitry is configured to encode data to be transmitted into data units, to assign the encoded data units to different time slots using a resource unit as scheduled by the schedule information and to transmit the data units.

16. The second communication device as defined in embodiment 15, wherein the circuitry is configured to create two or more copies of each data block and to assign the copies to different time slots using a resource unit as scheduled by the schedule information.

17. The second communication device as defined in embodiment 15 or 16, wherein the circuitry is configured to encode the data before splitting them into data blocks and assigning them to different time slots.

18. A first communication method configured to simultaneously communicate with a group of two or more second communication devices, the method comprising generating schedule information that schedules, for two or more subsequent time slots, the assignment of different resource units to the second communication devices of the group of second communication devices to indicate, per time slot or per group of time slots, which second communication device of the group shall use which resource unit for data transmission, transmitting the schedule information to the group of second communication devices, and receiving data in subsequent time slots from second communication devices of the group that use the resource units according to the assignment scheduled by the schedule information for data transmission.

19. A second communication method configured to communicate with a first communication device that is configured to simultaneously communicate with a group of two or more second communication devices, the method comprising receiving schedule information that schedules, for two or more subsequent time slots, the assignment of different resource units to the second communication devices of the group of second communication devices to indicate, per time slot or per group of time slots, which second communication device of the group shall use which resource unit for data transmission, and transmitting data in subsequent time slots using the resource units according to the assignment scheduled by the schedule information for the second communication device.

20. A non-transitory computer-readable recording medium that stores therein a computer program product, which, when executed by a processor, causes the method according to claim 18 or 19 to be performed.

21. A computer program comprising program code means for causing a computer to perform the steps of said method according to embodiment 18 or 19 when said computer program is carried out on a computer.

The invention claimed is:

1. A first communication device comprising circuitry configured to simultaneously communicate with a group of two or more second communication devices, the circuitry being configured to generate schedule information that schedules, for two or more subsequent time slots, the assignment of different resource units to the second communication devices of the group of second communication devices to indicate, per time slot or per group of time slots, which second communication device of the group shall use which resource unit for data transmission, and includes a total number of time slots for which the schedule information schedules the assignment of different resource units, transmit the schedule information to the group of second communication devices as a triggering single-user (SU) physical protocol data unit (SU PPDU) via multi-cast mode or broadcast mode transmission, receive data in subsequent time slots from second communication devices of the group that use the resource units according to the assignment scheduled by the schedule information for data transmission, and generate trigger information that indicates whether data transmitted in subsequent time slots are separated by a time distance or by data transmission by the first communication device, wherein the trigger information includes an identifier of the schedule information and a time slot index indicating a specific time slot of the two or more subsequent time slots to be used for data transmission.

2. The first communication device as claimed in claim 1, wherein the trigger information further indicates at least one of
a length of time slots for which the schedule information schedules the assignment of different resource units, and
if a continuation trigger in data transmission by the first communication device is required to proceed to a next time slot.

3. The first communication device as claimed in claim 2, wherein the circuitry is configured to include the trigger information and the schedule information in a trigger frame transmitted.

4. The first communication device as claimed in claim 2, wherein the trigger information further includes one or more of
a modulation coding scheme to be applied by the second communication devices to the data to be transmitted,
power control parameters to be applied by the second communication devices, and
parameters configuring a physical layer of the second communication devices to be applied for the data to be transmitted.

5. The first communication device as claimed in claim 1, wherein the circuitry is configured to generate the schedule information in the form of a table comprising one or more entries indicating that the corresponding second communication device does not transmit data or is not addressed in corresponding time slot and/or that the corresponding resource unit is available for use by any other second communication devices.

6. The first communication device as claimed in claim 1, wherein the circuitry is configured to transmit, after receiving data from second communication devices in one or more time slots, continuation trigger information indicating one or more of
an indication of the schedule information to which the continuation trigger applies;
a number and/or length of the following one or more time slots;
that the schedule information still applies;
at least part of the schedule information and/or trigger information that applies to the following one or more time slots; and
the second communication devices to which the continuation trigger information applies.

7. The first communication device as claimed in claim 6, wherein the circuitry is configured to transmit the continuation trigger information in a continuation trigger frame or in a continuation trigger subfield of a header of a transmitted protocol data unit containing the continuation trigger information.

8. The first communication device as claimed in claim 1, wherein the circuitry is configured to stop the application of schedule information by transmitting a stop signaling or including a timeout value into the schedule information or indicating that application of the schedule information stops after the last time slot for which an assignment is included in the schedule information.

9. The first communication device as claimed in claim 1, wherein the circuitry is configured to receive data units, into which data transmitted by a second communication device are encoded, from different time slots and/or different resource units according to the schedule information for said second communication device and to decode the data from the received data units.

10. The first communication device as claimed in claim 9, wherein the circuitry is configured to verify a status of reception and/or transmit an acknowledgement of the data after decoding them from the received data units.

11. The first communication device as claimed in claim 1, wherein the circuitry is configured to transmit, after receiving data from second communication devices in one or more subsequent time slots, conditional continuation trigger information indicating, for one or more subsequent time slots, which resource units are assigned to second communication devices for retransmission of data and/or which resource units are unused and/or available for use by other second communication devices.

12. The first communication device as claimed in claim 1, wherein the schedule information includes a table indicating the assignment of the different resource units, a first axis of the table identifying communications devices and a second axis of the table identifying time slots.

13. A second communication device comprising circuitry configured to communicate with a first communication device that is configured to simultaneously communicate with a group of two or more second communication devices, the circuitry being configured to receive, as a triggering single-user (SU) physical protocol data unit (SU PPDU) via multi-cast mode or broadcast mode transmission, schedule information that schedules, for two or more subsequent time slots, the assignment of different resource units to the second communication devices of the group of second communication devices to indicate, per time slot or per group of time slots, which second communication device of the group shall use which resource unit for data transmission, and includes a total number of time slots for which the schedule information schedules the assignment of different resource units, receive trigger information that indicates whether data transmitted in subsequent time slots are separated by a time distance or by data transmission by the first communication device, and transmit data in subsequent time slots using the resource units according to the assignment scheduled by the schedule information for the second communication device, wherein the trigger information includes an identifier of the schedule information and a time slot index indicating a specific time slot of the two or more subsequent time slots to be used for data transmission.

14. The second communication device as claimed in claim 13, wherein the circuitry is configured to transmit data after the schedule has been received on the resource unit assigned in a first time slot, and/or transmit data in further time slots on corresponding resource units defined by the schedule information either after the previous time slot, or after a response from the first communication device has been received after the previous time slot, or after a response from the first communication device containing a continuation trigger which addresses the second communication device has been received after the previous time slot.

15. The second communication device as claimed in claim 13, wherein the circuitry is configured to encode data to be transmitted into data units, to assign the encoded data units to different time slots using a resource unit as scheduled by the schedule information and to transmit the data units.

16. The second communication device as claimed in claim 15, wherein the circuitry is configured to create two or more copies of each data block and to assign the copies to different time slots using a resource unit as scheduled by the schedule information.

17. The second communication device as claimed in claim 15, wherein the circuitry is configured to encode the data before splitting them into data blocks and assigning them to different time slots.

18. A first communication method configured to simultaneously communicate with a group of two or more second communication devices, the method comprising:

generating schedule information that schedules, for two or more subsequent time slots, the assignment of different resource units to the second communication devices of the group of second communication devices to indicate, per time slot or per group of time slots, which second communication device of the group shall use which resource unit for data transmission, and includes a total number of time slots for which the schedule information schedules the assignment of different resource units, transmitting the schedule information to the group of second communication devices as a triggering single-user (SU) physical protocol data unit (SU PPDU) via multi-cast mode or broadcast mode transmission, receiving data in subsequent time slots from second communication devices of the group that use the resource units according to the assignment scheduled by the schedule information for data transmission, and generating trigger information that indicates whether data transmitted in subsequent time slots are separated by a time distance or by data transmission by the first communication device, wherein the trigger information includes an identifier of the schedule information and a time slot index indicating a specific time slot of the two or more subsequent time slots to be used for data transmission.

19. A second communication method configured to communicate with a first communication device that is configured to simultaneously communicate with a group of two or more second communication devices, the method comprising:

receiving, as a triggering single-user (SU) physical protocol data unit (SU PPDU) via multi-cast mode or broadcast mode transmission, schedule information that schedules, for two or more subsequent time slots, the assignment of different resource units to the second communication devices of the group of second communication devices to indicate, per time slot or per group of time slots, which second communication device of the group shall use which resource unit for data transmission, and includes a total number of time slots for which the schedule information schedules the assignment of different resource units, receiving trigger information that indicates whether data transmitted in subsequent time slots are separated by a time distance or by data transmission by the first communication device, and transmitting data in subsequent time slots using the resource units according to the assignment scheduled by the schedule information for the second communi- cation device, wherein the trigger information includes an identifier of the schedule information and a time slot index indicat- ing a specific time slot of the two or more subsequent time slots to be used for data transmission.

20. A non-transitory computer-readable recording medium that stores therein a computer program product, which, when executed by a processor, causes the method according to claim 18 or 19 to be performed.

* * * * *